(12) United States Patent
Nishizawa

(10) Patent No.: US 8,783,104 B2
(45) Date of Patent: Jul. 22, 2014

(54) VIBRATION GYRO ELEMENT, VIBRATION GYRO SENSOR, ELECTRONIC DEVICE, AND METHOD OF DETECTING PHYSICAL QUANTITY OF VIBRATION

(75) Inventor: Ryuta Nishizawa, Suwa (JP)

(73) Assignee: Seiko Epson Corporation (JP)

( * ) Notice: Subject to any disclaimer, the term of this patent is extended or adjusted under 35 U.S.C. 154(b) by 647 days.

(21) Appl. No.: 13/042,795

(22) Filed: Mar. 8, 2011

(65) Prior Publication Data

US 2011/0226057 A1  Sep. 22, 2011

(30) Foreign Application Priority Data

Mar. 19, 2010 (JP) ................................. 2010-063901

(51) Int. Cl.
G01C 19/00 (2013.01)
(52) U.S. Cl.
USPC ........................................................ 73/504.12
(58) Field of Classification Search
CPC ............... G01C 19/56; G01C 19/5642; G01C 19/5719; G01P 9/04
USPC ........................ 73/504.02, 504.12, 503.3, 510
See application file for complete search history.

(56) References Cited

U.S. PATENT DOCUMENTS

| | | | | |
|---|---|---|---|---|
| 4,524,619 A * | 6/1985 | Staudte | ............ | 73/504.16 |
| 4,654,663 A * | 3/1987 | Alsenz et al. | ............ | 340/870.3 |
| 4,836,023 A * | 6/1989 | Oikawa | ............ | 73/504.14 |
| 5,166,571 A * | 11/1992 | Konno et al. | ............ | 310/333 |
| 5,343,749 A | 9/1994 | Macy | | |
| 5,476,008 A * | 12/1995 | Pinson | ............ | 73/504.16 |
| 5,824,900 A * | 10/1998 | Konno et al. | ............ | 73/504.16 |
| 5,854,427 A * | 12/1998 | Terada et al. | ............ | 73/504.16 |
| 5,998,911 A * | 12/1999 | Kikuchi et al. | ............ | 310/367 |
| 6,018,212 A | 1/2000 | Kikuchi et al. | | |
| 6,346,765 B1 * | 2/2002 | Kikuchi et al. | ............ | 310/367 |
| 6,414,416 B1 * | 7/2002 | Janiaud et al. | ............ | 310/321 |
| 6,418,789 B1 * | 7/2002 | Ishitoko et al. | ............ | 73/504.12 |
| 6,437,483 B2 * | 8/2002 | Kikuchi et al. | ............ | 310/321 |
| 6,439,051 B2 * | 8/2002 | Kikuchi et al. | ............ | 73/504.12 |
| 6,747,393 B2 * | 6/2004 | Kikuchi et al. | ............ | 310/321 |
| 6,858,972 B2 * | 2/2005 | Kikuchi et al. | ............ | 310/367 |

(Continued)

FOREIGN PATENT DOCUMENTS

| | | |
|---|---|---|
| CN | 1782779 | 6/2006 |
| JP | 05-256723 | 10/1993 |

(Continued)

*Primary Examiner* — Peter Macchiarolo
*Assistant Examiner* — Samir M Shah
(74) *Attorney, Agent, or Firm* — Harness, Dickey & Pierce, P.L.C.

(57) ABSTRACT

A vibration gyro element includes: a base section; a detection arm extending from the base section in a first direction; a joint section disposed at an end portion of the base section; a first drive arm extending from the joint section in a second direction intersecting with the first direction in a plan view; a second drive arm extending from the joint section in a direction opposite to the extending direction of the first drive arm; a first set of drive electrodes provided to the first drive arm; a second set of drive electrodes provided to the second drive arm; and a set of detection electrodes provided to the detection arm, wherein the first drive arm vibrates in a third direction perpendicular to the first direction and the second direction, the second drive arm vibrates in a same direction as the first drive arm.

10 Claims, 18 Drawing Sheets

(56) References Cited

U.S. PATENT DOCUMENTS

| | | |
|---|---|---|
| 7,043,986 B2 | 5/2006 | Kikuchi et al. |
| 7,168,289 B2 * | 1/2007 | Kikuchi ........................ 73/1.37 |
| 7,412,885 B2 * | 8/2008 | Ogura ........................ 73/504.12 |
| 8,037,755 B2 * | 10/2011 | Nagata et al. ............. 73/504.04 |
| 8,049,394 B2 | 11/2011 | Kouma et al. |
| 2001/0043026 A1 | 11/2001 | Kikuchi et al. |
| 2003/0084723 A1 | 5/2003 | Kikuchi et al. |
| 2003/0084727 A1 * | 5/2003 | Mori ............................... 73/662 |
| 2004/0145281 A1 | 7/2004 | Kikuchi et al. |
| 2006/0201248 A1 | 9/2006 | Unno |
| 2008/0229824 A1 * | 9/2008 | Higuchi et al. ............ 73/504.16 |
| 2009/0165554 A1 | 7/2009 | Noguchi et al. |

FOREIGN PATENT DOCUMENTS

| | | | | |
|---|---|---|---|---|
| JP | 11-072334 | | 3/1999 | |
| JP | 2003-114127 A | | 4/2003 | |
| JP | 2004-245605 | | 9/2004 | |
| JP | 2005-245151 A | | 9/2005 | |
| JP | 2005245151 A | * | 9/2005 | ............... H02N 1/00 |
| JP | 2006-250769 | | 9/2006 | |
| JP | 2008-232696 A | | 10/2008 | |
| JP | 2013096882 A | * | 5/2013 | ............. G01C 19/56 |

* cited by examiner

Euler angle (0,1.5,0) quartz crystal substrate 25°C Bechmann's piezoelectric constant (d constant)

|     | $E_x$       | $E_y$       | $E_z$      |
|-----|-------------|-------------|------------|
| $S_x$  | 2.30850823  | 0.00000000  | 0.00000000 |
| $S_y$  | -2.28778103 | 0.00000000  | 0.00000000 |
| $S_z$  | 0.02072720  | 0.00000000  | 0.00000000 |
| $S_{yz}$ | 0.85144742  | 0.00000000  | 0.00000000 |
| $S_{zx}$ | 0.00000000  | -0.61031279 | 0.01598160 |
| $S_{xy}$ | 0.00000000  | -4.63299806 | 0.12131932 | d11, d12

VIBRATION GYRO ELEMENT, VIBRATION GYRO SENSOR, ELECTRONIC DEVICE, AND METHOD OF DETECTING PHYSICAL QUANTITY OF VIBRATION

BACKGROUND

1. Technical Field

The present invention relates to a vibration gyro element, a vibration gyro sensor, an electronic device, and a method of detecting physical quantity of a vibration gyro sensor.

2. Related Art

When angular velocity is applied to an object moving at a predetermined velocity, a Coriolis force is generated in the direction perpendicular to the plane determined by the axis of the direction (the velocity direction) of movement and the axis of the direction (the angular velocity direction) of the angular velocity vector. In the vibrating gyro sensor, the angular velocity is obtained based on the electrical signal varying in accordance with the Coriolis force. Specifically, the vibrating arm is exited to generate a driving vibration. When the angular velocity is applied, the detecting vibration is caused in the vibrating arm in the direction perpendicular to the direction of the driving vibration by the Coriolis force corresponding to the angular velocity. In the vibration gyro sensor using a piezoelectric material, the electric field is generated due to the distortion (the stress) caused in the vibrating arm by the detecting vibration, thereby migrating the charge. The variation in the electrical signal (i.e., a minute current signal) caused by the migration of the charge is proportional to the level of the angular velocity applied thereto. Therefore, by detecting the variation (e.g., the variation in the amplitude of the direct-current voltage) in the electrical signal, the angular velocity applied thereto can be detected.

As a vibration gyro element (a vibrator element used for the vibration gyro sensor) for constituting the vibration gyro sensor, there is known a so-called double T vibration gyro element (see, e.g., JP-A-2004-245605 (Document 1)). In the double T vibration gyro element, roughly T-shaped driving vibration systems are arranged symmetrically about the detection vibration system located at the center. In the double T vibration gyro element, the Coriolis force caused in the drive arm by the angular velocity acting around the Z-axis is propagated to the detection arm via the support arm and the base section.

Further, in JP-A-2006-250769 (Document 2), there is proposed a structure of reducing the energy loss in the double T vibration gyro element. The vibration gyro element disclosed in Document 2 is composed of a piezoelectric material having a trigonal crystal structure. The vibration gyro element has a detection arm in the Y-axis direction, and a pair of drive arms extending in directions at angles of +120° and −120° respectively with the Y-axis. The drive arms vibrate in the X-Y plane, and if the angular velocity acts thereon around the Z-axis, the Coriolis force is generated in the extending directions of the drive arms. The detection vibration in the X-axis direction is caused in the detection arm by the X-axis direction component of the Coriolis force.

The vibration gyro element described in Document 1 or Document 2 is for detecting the angular velocity acting around the Z-axis, and cannot directly detect the angular velocity acting on the X-axis or the Y-axis. Therefore, in order for detecting the angular velocity acting on the X-axis or the Y-axis using this gyro element, it is required to arrange the element so as to erect vertically. Therefore, the size in the thickness direction of the sensor is large (difficult to be low-profile), and the mounting cost also increases.

The gyro element for detecting the angular velocity acting on the X-axis or the Y-axis is described in, for example, JP-A-5-256723 (Japanese Patent No. 3,007,216) (Document 3).

In the vibration gyro element described in Document 3, a common (integrated) vibrating arm extends in a predetermined direction from the base section. The tip portion of the vibrating arm is forked into two. At the tip portion of each of first and second arms thus formed in a two-forked manner, there is formed a drive electrode. Further, on the side of the vibrating arm near to the base section, there is formed a detection electrode. The tip portion of the common vibrating arm forked into two is exited with the voltage applied to the drive electrodes, thereby causing the driving vibration in the crystal plane (the X-Y plane) of quartz crystal or quartz constituting the vibrating arm. When the angular velocity is applied around the axis (around the Y-axis) of the extending direction of the drive arm, the Coriolis force acts perpendicularly to the crystal plane, and the detection vibration is caused in a direction (the Z-axis direction) perpendicular to the crystal plane.

Further, in recent years, attention is focused on the technology of using the micro electromechanical system (MEMS) technology to realize a small-sized and highly accurate vibration gyro element (the vibrator element for the vibration gyro sensor).

In the vibration gyro element described in Document 1, the Coriolis force (i.e., the detection vibration) caused in the drive arm is transmitted to the detection arm via the support arm and the base section. Since the detection vibration is attenuated while being propagated through the support arm and the base section, it has to admit that energy loss is caused in the propagation process of the detection vibration.

Further, in the vibration gyro element described in Document 2, the pair of drive arms extends in the directions at angles of +120° (at angle of −60° with the −Y-axis) and −120° (at angle of +60° with the −Y-axis) with the +Y-axis, respectively. Since the Coriolis force is generated in the direction perpendicular to the plane determined by the direction (the velocity direction) of the driving vibration and the axis of the angular velocity vector (the angular velocity direction), the force generated in the X-axis direction and for exiting the detection vibration becomes to have the smaller amplitude obtained by multiplying by sin 60°.

Further, the problem in the vibration gyro element described in Document 3 will be described below. FIGS. 19A through 19C are diagrams for explaining a vibration gyro element in the related art. FIG. 19A is a perspective view showing the structure of the vibration gyro element described in Document 3, and FIGS. 19B and 19C show examples of the cross-sectional view of the drive arm along the line A-A' in FIG. 19A.

The vibration gyro element 900 shown in FIG. 19A has two drive arms 901, 903. In each of the drive arms 901, 903 of this vibration gyro element 900, ideally, the driving vibration is generated in the X-axis direction, the Coriolis force in the Z-axis direction is caused by the angular velocity around the Y-axis, and the detection vibration is caused in the Z-axis direction. However, in reality, due to the presence of such a manufacturing error as shown in FIGS. 19B and 19C, the vibration in the Z-axis direction is mixed in the driving vibration in the X-axis direction. In the example shown in FIG. 19B, due to the generation of a fin section in the drive arm, the direction of the actual driving vibration is shifted from the direction of the ideal driving vibration. Further, in the example shown in FIG. 19C, due to misalignment, unconformity is caused in the drive arm, thereby shifting the direction of the actual driving vibration from the direction of the ideal driving vibration.

The vibration in the Z-axis direction mixed therein is detected by the detection electrode as the detection vibration, and the angular velocity output is generated despite that no angular velocity is applied. Specifically, in FIGS. 19B and 19C, the mechanical leakage component represented by the thick dotted line is caused even if the actual angular velocity is zero. Therefore, despite that no angular velocity is actually applied, the electrical signal corresponding to the mechanical leakage component is output. This is the failure by the mechanical coupling, and the error component thereof is extremely large compared to the output by the Coriolis force, and the imbalance in the driving vibration affects the detection accuracy of the vibration gyro element. Further, the mechanical coupling is varied by the ambient temperature, and therefore, significantly affects the temperature stability of the gyro sensor.

SUMMARY

According to at least one of some aspects of the invention, the detection efficiency of the vibration gyro sensor can further be improved.

1. According to a first aspect of the invention, there is provided a vibration gyro element including a base section, a detection arm extending from the base section in a first direction, a joint section disposed at an end portion of the detection arm opposite to another end portion near to the base section, a first drive arm extending from the joint section in a second direction intersecting with the first direction in a plan view, a second drive arm extending from the joint section in a direction opposite to the extending direction of the first drive arm, a first set of drive electrodes provided to the first drive arm, a second set of drive electrodes provided to the second drive arm, and a set of detection electrodes provided to the detection arm, wherein the first drive arm vibrates in a third direction perpendicular to the first direction and the second direction, the second drive arm vibrates in the same direction as the first drive arm, and thereby detecting a physical quantity acting around an axis in the first direction.

In the present aspect of the invention, the first drive arm and the second drive arm are coupled to the joint section of the detection arm extending in the first direction in a predetermined plane. The first drive arm extends in the positive second direction in the predetermined plane (e.g., a plane including a predetermined crystal plane of the piezoelectric plate). The second drive arm extends in the negative second direction (the direction opposite to the positive second direction) in a predetermined plane. The first and second directions intersect with each other, and are perpendicular to each other (but are not limited thereto), for example.

The first drive arm and the second drive arm each vibrate in the third direction perpendicular to the predetermined plane (i.e., the driving vibration in the out-of-plane direction is excited). If the machining error exists, although the vibration in the first direction is mixed in the vibration in the third direction due to the mechanical coupling, since the detection vibration is in the second direction, the vibration in the first direction has no influence on the detection vibration. Therefore, according to the present aspect of the invention, even in the case in which the machining error exists, the superfluous signal due to the mechanical coupling can be prevented from occurring, and the Coriolis force can efficiently be detected. Further, since the influence of the variation in the mechanical coupling due to the temperature can also be eliminated, the gyro sensor having preferable temperature stability can be realized.

2. According to a second aspect of the invention, in the vibration gyro element of the above aspect of the invention, the detection arm, the first drive arm, and the second drive arm are all made of the same piezoelectric material.

In this aspect of the invention, the first direction as the extending direction of the detection arm and the second direction as the extending direction of each of the first and second drive arms are perpendicular to each other. Further, in the present aspect, at least a part of the drive arm and at least a part of the detection arm are made of the same piezoelectric material. For example, it is possible to form the drive arms and the detection arm using the same piezoelectric material (e.g., a quartz crystal plate or $GaPO_4$) to thereby vibrate the drive arms and the detection arm due to the piezoelectric characteristics inherent in the quartz crystal plate. Further, it is also possible, for example, to form the piezoelectric film (which is an element constituting a part of the drive arm (or the detection arm)) on the base material having elasticity constituting a part of the drive arm (or the detection arm). In other words, it is possible to convert an electrical field into distortion to thereby vibrate the driving arm, or to convert a second detection vibration generated in the detection arm into an electrical field due to the piezoelectric characteristics inherent in the piezoelectric film.

For example, in the case of processing the quartz crystal plate by photolithography, the arm extending in the X-axis direction has a higher accuracy in processing the cross-sectional shape (has small machining error due to the anisotropy of the quartz crystal) than the arm extending in the Y-axis direction. Therefore, according to the present aspect of the invention, the machining error of the drive arms (the first and second drive arms) can be reduced. Therefore, it is possible to generate the driving vibration having small influence of the mechanical coupling and superior in balance.

3. According to a third aspect of the invention, in the vibration gyro element of the above aspect of the invention, the first drive arm, the second drive arm, and the detection arm each have a pair of principal surfaces opposed to each other and a pair of side surfaces coupling the principal surfaces to each other, the first set of drive electrodes and the second set of drive electrodes are each disposed on at least one of the pair of principal surfaces, and each form an inter digital transducer having electrodes arranged in the second direction, and the set of detection electrodes are disposed on the pair of principal surfaces and the pair of side surfaces in a solid manner.

According to the present aspect of the invention, each of the first set of drive electrodes provided to the first drive arm and the second set of drive electrodes provided to the second drive arm is an inter digital transducer (IDT electrodes). Due to the inter digital transducer (IDT electrodes), it is possible to generate the electrical field (the electrical field in the second direction as the extending direction of the drive arms) for vibrating the drive arms out of the predetermined plane.

Further, it is possible to take out the minute electrical signal generated in accordance with the second detection vibration using the first through fourth electrodes respectively provided to the first through fourth surfaces of the detection arm. The first electrode and the second electrode are connected to each other, and the third electrode and the fourth electrode are connected to each other. According to this arrangement of the detection electrode, there can be obtained an advantage of canceling out the unnecessary driving vibration leaking from the first drive arm into the detection arm and the unnecessary driving vibration leaking from the second drive arm into the detection arm with each other. Specifically, if the electrical field in the direction from the first electrode toward the second electrode is urged to occur by the unnecessary driving vibration leaking from each of the drive arms, since the first and second electrodes are commonly connected to each other to have the same electrical potential, such an electrical field does not actually occur. Therefore, according to this electrode arrangement, the noise signal due to the unnecessary driving vibration is not detected. Therefore, according to the present aspect of the invention, the superfluous signal due to the mechanical coupling can be prevented from occurring, and the Coriolis force can efficiently be detected.

4. According to a fourth aspect of the invention, in the vibration gyro element of the above aspect of the invention, each of the first inter digital transducer and the second inter digital transducer has a first opposed portion composed of a pair of electrodes disposed so as to be opposed to each other with a predetermined distance and a second opposed portion disposed adjacent to the first opposed portion and composed of a pair of electrodes disposed so as to be opposed to each other with a predetermined distance, the first opposed portion and the second opposed portion are disposed long the second direction as the extending direction of the drive arms, and assuming that the predetermined distance is L1 and the distance between the first opposed portion and the second opposed portion is L2, L1<L2 is true. Further, in another aspect of the invention, in the inter digital transducer, assuming that a distance between one of the electrodes and another of the electrodes adjacent on one side of the one of the electrodes is L1, and a distance between the one of the electrodes and another of the electrodes adjacent on the other side of the one of the electrodes is L2, L1<L2 is true.

The inter digital transducer has the first opposed portion composed of a pair of electrodes disposed so as to be opposed to each other with the predetermined distance, and the second opposed portion disposed adjacent to the first opposed portion and composed of a pair of electrodes disposed so as to be opposed to each other with the predetermined distance. In each of the first opposed portion and the second opposed portion, an electrical field (an effective electrical field) is generated between the pair of electrodes opposed to each other, and the electrical field (the effective electrical field) is applied to the drive arm. Meanwhile, an electrical field (an ineffective electrical field) is also generated between the electrode on the side of the second opposed portion in the first opposed portion and the electrode on the side of the first opposed portion of the second opposed portion. In the case in which the direction of the effective electrical field generated in each of the first opposed portion and the second opposed portion and the direction of the ineffective electrical field generated between the first opposed portion and the second opposed portion are opposite to each other, there is caused a problem that a part of the effective electrical field is canceled out with the ineffective electrical field.

Therefore, in the present aspect of the invention, the distance (L2; specifically, the distance between the electrode of the first opposed portion located on the side of the second opposed portion and the electrode of the second opposed portion located on the side of the first opposed portion) between the first opposed portion and the second opposed portion is set to be larger than the distance (L1) between the electrodes in each of the first opposed portion and the second opposed portion. Thus, it is possible to reduce the harmful influence (i.e., the cancellation of a part of the effective electrical field with the ineffective electrical field) exerted by the ineffective electrical field generated between the first opposed portion and the second opposed portion.

5. According to a fifth aspect of the invention, in the vibration gyro element of the above aspect of the invention, each of the first inter digital transducer and the second inter digital transducer additionally has a third opposed portion disposed adjacent to the second opposed portion and composed of a pair of electrodes disposed so as to be opposed to each other with the predetermined distance, the distance from the base section increases in the order of the first opposed portion, the second opposed portion, and the third opposed portion, and assuming that the distance between the second opposed portion and the third opposed portion is L3, L2<L3 is true. Further, in another aspect of the invention, the distance L2 in a vicinity of a tip of either of the first and second drive arms is larger than the distance L2 in a vicinity of the joint section.

In order for generating the driving vibration (the out-of-plane vibration) in the drive arm, it is required to generate contraction and expansion (tension) distortions (stresses) in the principal surface (e.g., at least one of the obverse surface and the reverse surface) of the drive arm. Since the drive arm vibrates in the out-of plane direction based on the base section as the fixed end, the most effective distortion for bending the drive arm is the distortion at the place near to the base section. The distortion at the place (the tip portion) distant from the base section has a small influence on the bend of the drive arm.

Based on this speculation, in the present aspect of the invention, the intervals of the three opposed portions included in the inter digital transducer are varied in accordance with the distance from the base section. Specifically, the distance (L3) between the second opposed portion and the third opposed portion is set larger than the distance (L2) between the first opposed portion and the second opposed portion. According to such a configuration, the number of opposed portions disposed along the extending direction of the drive arm can be reduced compared to the case of disposing the opposed portions at regular intervals. This means reduction of the total amount of the electrical fields generated in the drive arm, and therefore, the effect of reducing the power consumption can be obtained. On the other hand, even if the electrical field at the place distant from the base section is reduced, since the extent of a contribution of the electrical field to the bend of the drive arm is small, it is possible to generate the driving vibration with necessary amplitude in the drive arm.

6. According to a sixth aspect of the invention, there is provided a vibration gyro element including a base section, a first detection arm extending from the base section in a first direction, a second detection arm extending from the base section in a direction opposite to the extending direction of the first detection arm, a first joint section disposed at an end portion of the first detection arm opposite to another end portion near to the base section, a second joint section disposed at an end portion of the second detection arm opposite to another end portion near to the base section, a first drive arm extending from the first joint section in a second direction intersecting with the first direction in a plan view, a second drive arm extending from the first joint section in a direction opposite to the extension direction of the first drive arm, a third drive arm extending from the base section in the second direction, a fourth drive arm extending from the base section in a direction opposite to the extension direction of the third drive arm, a fifth drive arm extending from the second joint section in the second direction, and a sixth drive arm extending from the second joint section in a direction opposite to the extension direction of the fifth drive arm, wherein the first through sixth drive arms are each provided with a set of drive electrodes, the first and second detection arms are each provided with a set of detection electrodes, the first, second, fifth, and sixth drive arms vibrate in a third direction perpendicular to the first direction and the second direction, the third and fourth drive arms vibrate in a direction opposite to the vibrating direction of the first, second, fifth, and sixth drive arms, and thereby detecting a physical quantity acting around an axis in the first direction.

In the present aspect of the invention, the second detection arm is disposed in addition to the first detection arm. The first detection arm is provided with a first set of detection electrodes, and the second detection arm is provided with a second set of detection electrodes. The first detection arm extends from the base section in the positive first direction, and the second detection arm extends in the negative first direction. The detection sensitivity is enhanced by increasing the number of detection arms.

Further, in the present aspect of the invention, the third and fourth drive arms, and the fifth and sixth drive arms are disposed in addition to the first and second drive arms. The first and second drive arms extend from the joint section of the first detection arm in the respective directions opposite to each other (i.e., the positive second direction and the negative second direction). The third and fourth drive arms extend from the base section in the respective directions opposite to each other (i.e., the positive second direction and the negative second direction). The fifth and sixth drive arms extend from the joint section of the second detection arm in the respective directions opposite to each other (i.e., the positive second direction and the negative second direction). The first through sixth drive arms are provided with the first through sixth sets of drive electrodes, respectively.

Further, when the first and second drive arms are displaced in the positive third direction due to the driving vibration, the third and fourth drive arms are displaced in the negative third direction due to the driving vibration, and at the same time, the fifth and sixth drive arms are displaced in the positive third direction due to the driving vibration. Specifically, the driving vibration in the "walk" mode is excited in each of the first drive arm, the second drive arm, the fifth drive arm, and the sixth drive arm in the third direction and so that the direction of the displacement is the same between the arms. In contrast, the driving vibration in the "walk" mode is excited in each of the third drive arm and the fourth drive arm in the third direction and so that the direction of the displacement is opposite to the direction of the displacement of each of the first drive arm, the second drive arm, the fifth drive arm, and the sixth drive arm.

In other words, out of the three pairs of drive arms, the two pairs of drive arms located on the both sides are driven in phase, while the pair of drive arms located at the center is driven in reverse phase, and thus the dynamically-balanced driving vibration can be realized. Since the out-of-plane vibration is well-balanced, the Q-value of the resonance is increased, the amplitude of the driving vibration is increased, and the vibration frequency can also be stabilized. The severity of the Coriolis force is proportional to the velocity of the driving vibration, and the velocity of the driving vibration is determined by the amplitude and the vibrational frequency. Therefore, since the velocity of the driving vibration is raised to be stabilized, the vibration gyro element with a higher sensitivity and a higher stability of the sensitivity can be realized.

7. According to a seventh aspect of the invention, in the vibration gyro element of the above aspect of the invention, the first through sixth drive arms, the first detection arm, and the second detection arm each have a pair of principal surfaces opposed to each other and a pair of side surfaces coupling the principal surfaces to each other, the sets of drive electrodes are each disposed on at least one of the pair of principal surfaces, and each form an inter digital transducer having electrodes arranged in the second direction, and the set of detection electrodes are disposed on the pair of principal surfaces and the pair of side surfaces in a solid manner.

In the present aspect of the invention, the electrode structure in the sixth aspect of the invention is defined. Specifically, the first drive arm is provided with the first set of drive electrodes, and the first set of drive electrodes corresponds to the first inter digital transducer disposed on at least one of the pair of principal surfaces (the first surface and the second surface) of the first drive arm. Similarly, the second set of drive electrodes provided to the second drive arm corresponds to the second inter digital transducer disposed on at least one of the pair of principal surfaces (the first surface and the second surface) of the second drive arm, the third set of drive electrodes provided to the third drive arm corresponds to the third inter digital transducer disposed on at least one of the pair of principal surfaces (the first surface and the second surface) of the third drive arm, the fourth set of drive electrodes provided to the fourth drive arm corresponds to the fourth inter digital transducer disposed on at least one of the pair of principal surfaces (the first surface and the second surface) of the fourth drive arm, the fifth set of drive electrodes provided to the fifth drive arm corresponds to the fifth inter digital transducer disposed on at least one of the pair of principal surfaces (the first surface and the second surface) of the fifth drive arm, and the sixth set of drive electrodes provided to the sixth drive arm corresponds to the sixth inter digital transducer disposed on at least one of the pair of principal surfaces (the first surface and the second surface) of the sixth drive arm. The driving vibration in the third direction (the out-of-plane direction) is excited in each of the drive arms due to the electrical field by the inter digital transducer.

Further, the first through fourth surfaces of the first detection arm are respectively provided with the first through fourth electrodes for the first detection arm. Similarly, the first through fourth surfaces of the second detection arm are respectively provided with the first through fourth electrodes for the second detection arm. The directions of the electrical fields generated respectively to the first and second detection arms in accordance with the distortion by the detection vibration are the same. In consideration of this point, the connection between the electrode in the first detection arm and the electrode in the second detection arm is determined. Specifically, the first electrode for the first detection arm and the second electrode for the first detection arm are commonly connected to the first electrode for the second detection arm and the second electrode for the second detection arm. Further, the third electrode for the first detection arm and the fourth electrode for the first detection arm are commonly connected to the third electrode for the second detection arm and the fourth electrode for the second detection arm. The minute electrical signal generated in accordance with the second detection vibration can be taken out from the two common connection points.

8. According to an eighth aspect of the invention, there is provided a vibration gyro sensor including the vibration gyro element according any one of the aspects of the invention described above, and a detection circuit adapted to detect a physical quantity acting around an axis in the first direction based on an electrical signal output from the set of detection electrodes.

According to this configuration, the vibration gyro sensor (vibration gyroscope) capable of performing the detection with high accuracy can be realized.

9. According to a ninth aspect of the invention, there is provided an electronic device including a first sensor including the vibration gyro element according to any one of the aspects of the invention described above, and a second sensor including a detection element adapted to detect a physical quantity different from the physical quantity detected by the first sensor.

According to this configuration, for example, a high-performance sensor unit (a kind of electronic device) combining the vibration gyro element capable of detecting the angular velocity with high accuracy and another detection element for detecting the physical quantity other than the angular velocity can be realized. Further, by installing the sensor unit in the electronic device such as a camera or FA equipment, the electronic device can be made more high-performance.

10. According to a tenth aspect of the invention, there is provided method of detecting an angular velocity using a vibration gyro sensor, the method including the steps of (a) providing a vibration gyro element including a base section, a detection arm extending from the base section in a first direction, a joint section disposed at an end portion of the detection arm opposite to another end portion near to the base section, a first drive arm extending from the joint section in a second direction intersecting with the first direction in a plan view, and a second drive arm extending from the joint section in a direction opposite to the extending direction of the first drive arm, (b) vibrating the first drive arm in a third direction perpendicular to the first direction and the second direction, (c) vibrating the second drive arm in the same direction as the first drive arm, (d) generating a Coriolis force in the first drive arm and the second drive arm in accordance with a physical quantity acting around an axis in the first direction, thereby generating a detection vibration in the second direction in the detection arm, and (e) detecting the physical quantity based on an electrical signal generated by a migration of a charge due to an electrical field generated by the detection vibration.

In the method of detecting the angular velocity (the physical quantity) of the present aspect of the invention, the vibration gyro element (the vibrator element for the vibration gyro sensor) composed of, for example, a quartz crystal plate (e.g., a Z-cut (substantially Z-cut) plate) is used. The detection arm extends from the base section in the first direction (e.g., the Y-axis direction). The first drive arm and the second drive arm extend from the joint section of the detection arm in the second directions (e.g., the X-axis directions) opposite to each other (e.g., the +X-axis direction and the −X-axis direction). The plane defined by an axis in the first direction and an axis in the second direction is a plane including the Z-plane of, for example, the quartz crystal plate. Further, according to the present aspect of the invention, the first direction and the second direction are perpendicular to each other.

The driving vibration (the out-of-plane vibration) in the third direction (the direction perpendicular to the plane defined by the axis in the first direction and the axis in the second direction) is excited in each of the drive arms using the distortion (Sx) in the second direction corresponding to the electrical field (e.g., the electrical field Ex in the X-axis direction) in the second direction of the quartz crystal plate.

Further, the Coriolis force in the second direction (e.g., the X-axis direction) is generated in the drive arm due to the angular velocity acting around the axis in the first direction (e.g., the Y-axis direction), and each of the drive arms is displaced by the Coriolis force. Since the drive arms are coupled to the same coupling section of the detection arm, the displacement of each of the drive arms directly becomes the displacement of the detection arm. Therefore, the detection vibration can efficiently be generated in the detection arm.

When the detection arm bends due to the detection vibration, the electrical field (Ex) in the second direction is caused by the distortion (Sy) in the first direction corresponding to the electrical field (Ex) in the second direction (the X-axis direction) of the quartz crystal plate constituting the detection arm. The detection circuit detects the angular velocity based on the electrical signal generated in accordance with the migration of the charge caused by the electrical field (Ex) in the second direction.

According to the present aspect of the invention, since the base section, the drive arms, and the detection arm themselves are formed of the quartz crystal plate, the vibration loss is smaller and the durability is also higher compared to the structure of forming the piezoelectric film on the base material. Further, since the out-of-plane vibration (the vibration in the "walk" mode) is used as the driving vibration, the well-balanced driving vibration can be excited compared to the case of using the conventional in-plane driving vibration. Further, there can be obtained an advantage of efficiently canceling out the unnecessary driving vibration leaking from the first drive arm into the detection arm and the unnecessary driving vibration leaking from the second drive arm into the detection arm with each other. Further, since the drive arms are directly coupled to the detection arm, the Coriolis force can efficiently be transferred to the detection arm. Therefore, the detection efficiency of the physical quantities can dramatically be improved. Further, since the drive arms and the detection arm are separated from each other, the electrode arrangement and the wiring in each of the arms can easily be performed. Further, since the drive arms and the detection arm are separated from each other, the influence of the capacitive coupling or the electromechanical coupling can also be reduced.

As described above, according to at least one of the aspects of the invention, the detection efficiency of the vibration gyro sensor can further be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, some preferred embodiments of the invention will be described in detail. It should be noted that the embodiments explained below do not unreasonably limit the content of the invention as set forth in the appended claims, and all of the constituents set forth in the embodiments are not necessarily essential as means of the invention for solving the problems.

First Embodiment

Figures 1A, 1B:
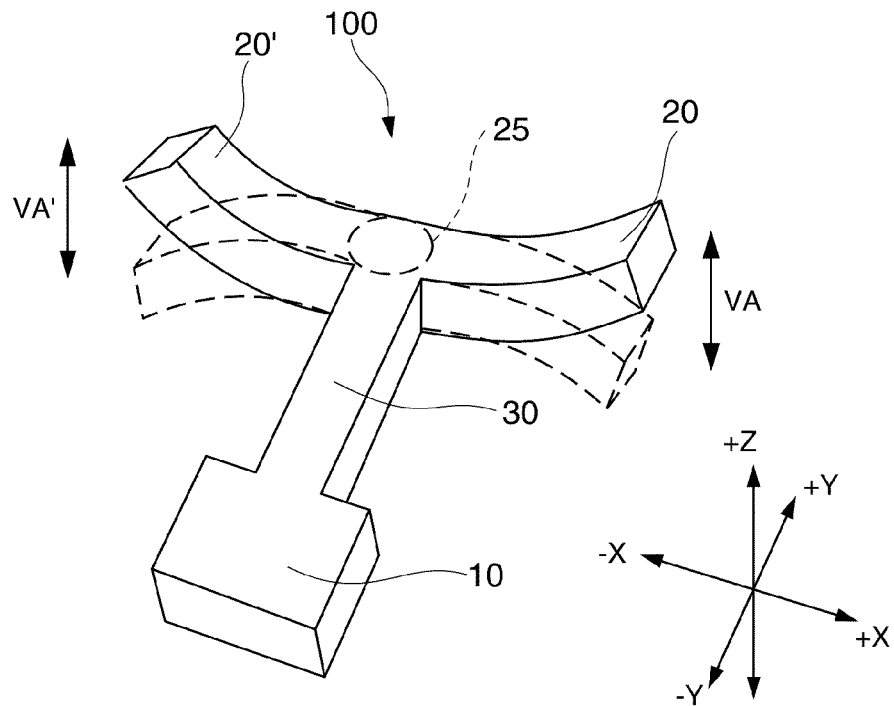
FIGS. 1A and 1B are diagrams for explaining the detection principle of the angular velocity in the vibration gyro element (the vibrator element for the vibration gyro sensor) according to a first embodiment.

FIGS. 1A and 1B are diagrams for explaining the detection principle of the angular velocity in the vibration gyro element (the vibrator element for the vibration gyro sensor) according to a first embodiment.

As shown in FIG. 1A, the vibration gyro element (the vibrator element for the vibration gyro sensor) 100 has a base section 10, a detection arm 30 extending from the base section in a predetermined plane (an X-Y plane) in a first direction (a Y-axis direction), and a pair of drive arms (a first drive arm 20 and a second drive arm 20') extending from a joint section 25 (indicated in the drawing by surrounding with a dotted line) of the detection arm 30 in the predetermined plane (the X-Y plane) in a second direction (an X-axis direction), which intersects with the first direction (the Y-axis direction). The first drive arm 20 extends in the positive second direction (+X-axis direction), and the second drive arm 20' extends in the negative second direction (−X-axis direction). Although it is preferable that the X-axis and the Y-axis are perpendicular to each other, this is not a limitation, but a certain shift in the direction, for example, is allowable.

It should be noted that the drive arms 20, 20' are provided with drive electrodes (not shown in FIG. 1A), and the detection arm 30 is provided with detection electrodes (not shown in FIG. 1A). Further, the base section 10 is fixed to a sensor case (not shown) with, for example, an adhesive.

The base section 10, the first drive arm 20, the second drive arm 20', and the detection arm 30 themselves can be formed of a piezoelectric material plate such as a quartz crystal plate. Further, it is also possible to form the base material of the base section 10, the first drive arm 20, the second drive arm 20', and the detection arm 30 using a material having elasticity, and to form piezoelectric films on the base material. In other words, it is also possible to convert an electrical field into distortion to thereby vibrate the drive arm, or to convert a second detection vibration generated in the detection arm into an electrical field, due to the piezoelectric characteristics inherent in the piezoelectric film. It should be noted that the structure of forming the base section 10, the first drive arm 20, the second drive arm 20', and the detection arm 30 themselves with the quartz crystal plate or the like has a smaller vibration loss and higher durability compared to the structure of forming the piezoelectric films on the base material.

It should be noted that in the present embodiment, it is assumed that the vibration gyro element (the vibrator element for the vibration gyro sensor) shown in FIG. 1A has the base section 10, the first drive arm 20, the second drive arm 20', and the detection arm 30 themselves formed of a Z-cut (substantially Z-cut) quartz crystal plate.

The joint section 25 disposed in the tip area of the detection arm 30 is not fixed unlike the base section 10, and therefore, if the first drive arm 20 and the second drive arm 20' are displaced by the Coriolis force, the joint section 25 is also displaced in accordance with the displacement, and thus, the detection arm 30 is also displaced. Therefore, it is possible to efficiently transfer (to efficiently convert the Coriolis force into the detection vibration) the Coriolis force generated in the first drive arm 20 and the second drive arm 20' to the detection arm 30.

Further, the plane (the X-Y plane) defined by the axis (the Y-axis) of the first direction and the axis (the X-axis) of the second direction is, for example, a plane including the Z-plane of the quartz crystal plate. As described above, the first direction and the second direction are directions intersecting with each other in a broader sense, and are assumed to be perpendicular to each other in the following explanation.

As shown in FIG. 1A, both of the driving vibration VA in the first drive arm 20 and the driving vibration VA' in the second drive arm 20' are generated in an out-of-plane direction (the Z-axis direction perpendicular to the X-Y plane). These driving vibrations VA, VA' can be generated by using, for example, the distortion (Sx) in the second direction corresponding to the electrical field (an electrical field Ex in the X-axis direction) in the second direction of the quartz crystal plate.

Here, FIG. 1B is referred to. FIG. 1B is a diagram showing the relationship between the piezoelectric constant, the electrical field, and the distortion of the quartz crystal plate. As indicated by surrounding with the thick line, the quartz crystal plate has two values d11, d12 showing high numerical values as the piezoelectric constants corresponding to the electrical field Ex in the second direction. The value d11 is the piezoelectric constant related to the amplitude of the distortion in the second direction (the X-axis direction) generated in accordance with the electrical field Ex in the second direction, and the value d12 is the piezoelectric constant related to the amplitude of the distortion in the first direction (the Y-axis direction) generated in accordance with the electrical field Ex in the second direction. As shown in the drawings, both of the values d11, d12 show the high numerical values, which expresses the fact that large distortions Sx, Sy are caused by the electrical fields Ex, and by contraries, the distortions Sx, Sy can generate the strong electrical fields Ex. Therefore, it can be applied to the excitation of the driving vibration and the detection of the physical quantities. It should be noted that the fact that the polarity of the value d12 is set to be negative means that when the positive electrical field (+Ex) is generated in the X direction, a negative distortion, namely contraction, is generated in the Y direction.

Specifically, in the quartz crystal plate, if the positive electrical field +Ex in the second direction (the X-axis direction) is generated, the distortion Sx of expanding in the second direction (the X-axis direction) is generated due to the value d11, and further, the distortion Sy of contracting in the Y direction is generated due to the value d12. In the present embodiment, the distortion Sx due to the piezoelectric constant d11 is used for the excitation of the driving vibrations VA and VA'.

Further, by contraries, when the contractional distortion Sy in the first direction (the Y-axis direction), for example, is generated, the electrical field +Ex is generated in the positive second direction (+X-axis direction) due to the piezoelectric constant d12, and thus, the charge migrates in the direction of the electrical field. In the present embodiment, the piezoelectric constant d12 is used for converting the detection vibration into an electrical signal.

Figure 2A:
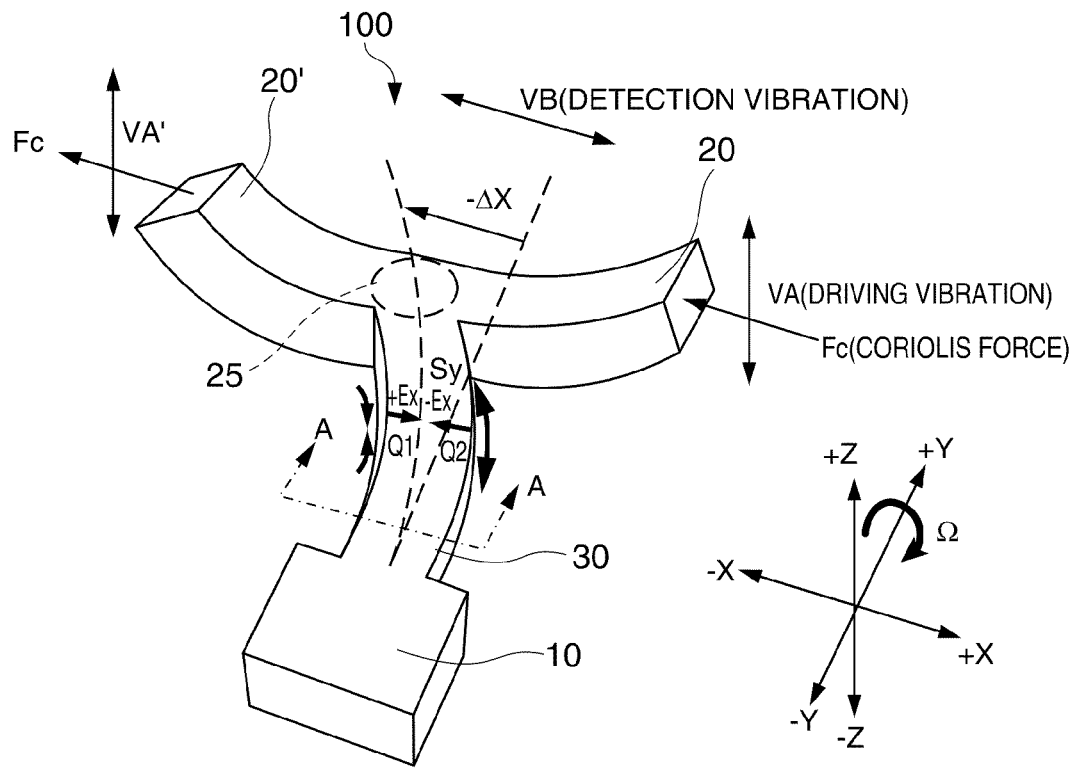
FIGS. 2A and 2B are diagrams for explaining the detection principle of the physical quantity of the vibration gyro element.
Figure 2B:
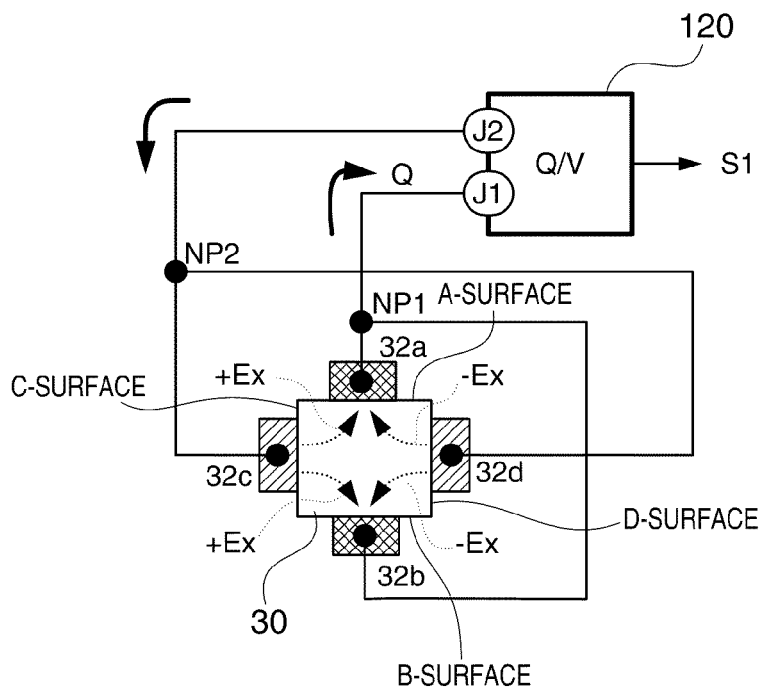

FIGS. 2A and 2B are diagrams for explaining the detection principle of the physical quantity of the vibration gyro element. FIG. 2A is a diagram showing an example of the vibrating posture of the arms, and FIG. 2B is a diagram showing the detection operation of the electrical signal.

As described above, the first drive arm 20 and the second drive arm 20' are excited in the third direction (the direction perpendicular to the plane defined by the first direction axis and the second direction axis, the Z-axis direction in this case) using the distortion Sx due to the piezoelectric constant d11 of the quartz crystal, and thus, the driving vibrations (the out-of-plane vibrations) VA, VA' are generated. The driving vibrations VA, VA' are in-phase driving vibrations. Specifically, when the first drive arm 20 is displaced in the positive third direction (the +Z-axis direction), the second drive arm 20' is also displaced in the positive third direction (the +Z-axis direction), and when the first drive arm 20 is displaced in the negative third direction (the −Z-axis direction), the second drive arm 20' is also displaced in the negative third direction (the −Z-axis direction).

When the vibration gyro element 100 rotates around the axis of the first direction (the Y-axis direction) in this state, the angular velocity is applied to the drive arms. The angular velocity in the three-dimensional space can be expressed using an angular velocity vector. In FIG. 2A, the angular velocity is generated in the direction indicated by the arrow in the drawing with respect to the Y-axis, and the angular velocity vector in this case is generated in the proceeding direction (i.e., the +Y-axis direction) of the right hand screw.

By the angular velocity Ω acting on the drive arm 20 and the drive arm 20' under driving vibration, the Coriolis force Fc is generated in each of the arms in the second direction (the X-axis direction; −X-axis direction in this case). Thus, the first drive arm 20 and the second drive arm 20' are displaced in the negative second direction (−X-axis direction). This displacement is transferred to the detection arm 30 via the joint section 25, and the detection arm 30 is also displaced in the negative second direction (the −X-axis direction). In other wards, the displacement of −ΔX is caused in the detection arm 30. Thus, the detection vibration VB is caused in the detection arm 30. In the example shown in FIG. 2A, the direction of the detection vibration VB is the negative second direction (the −X-axis direction).

When the detection arm 30 is bent, the electrical fields Ex (+Ex, −Ex) due to the distortion Sy in the first direction (the Y-axis direction) is caused in the detection arm 30 as shown in the drawing. Specifically, the electrical fields (+Ex, −Ex) in the second direction is caused by the piezoelectric constant (d12) related to the distortion Sy in the first direction corresponding to the electrical field (Ex) in the second direction (the X-axis direction) of the quartz crystal plate constituting the detection arm 30. The migration of the charge Q1, Q2 is caused by the electrical fields (+Ex, −Ex) in the second direction described above. In other words, a minute current is generated. The angular velocity can be detected based on this minute electrical signal (a charge signal or a current signal).

FIG. 2B shows a cross-sectional view of the detection arm 30 along the line A-A. The detection arm 30 has a first surface (an obverse surface, an A-surface) as a first principal surface, a second surface (a reverse surface, a B-surface) as a second principal surface, a third surface (a left side surface, a C-surface) connecting the first surface and the second surface, and a fourth surface (a right side surface, a D-surface) opposed to the third surface. The first, second, third, and fourth surfaces are respectively provided with a first electrode 32a, a second electrode 32b, a third electrode 32c, and a fourth electrode 32d as the detection electrodes.

The first electrode 32a is connected to the second electrode 32b, and the third electrode 32c is connected to the fourth electrode 32d. A common connection point NP1 between the first electrode 32a and the second electrode 32b is connected to an input terminal J1 of a Q/V conversion circuit 120 disposed in the anterior stage of the detection circuit. Further, a common connection point NP2 between the third electrode 32c and the fourth electrode 32d is connected to an input terminal J2 of the Q/V conversion circuit 120.

When the detection vibration VB is generated in the detection arm 30, the electrical fields Ex (the electrical fields +Ex, −Ex in the second direction) due to the piezoelectric constant d12 is generated in accordance with the distortions (−Sy, +Sy) in the first direction (the Y-axis direction) of the detection arm 30. When the electrical fields Ex (+Ex, −Ex) are generated, the migration of the charge Q occurs in accordance with the electrical fields Ex. Specifically, the migration of the charge Q occurs in the direction (the direction from the terminal J2 toward the terminal J1) indicated by the arrow in FIG. 2B. The minute current signal (the charge signal) caused by the migration of the charge is converted into the voltage by the Q/V conversion circuit 120 disposed in the anterior stage of the detection circuit. The physical quantity (the angular velocity) is detected based on the voltage signal.

Figure 3A:
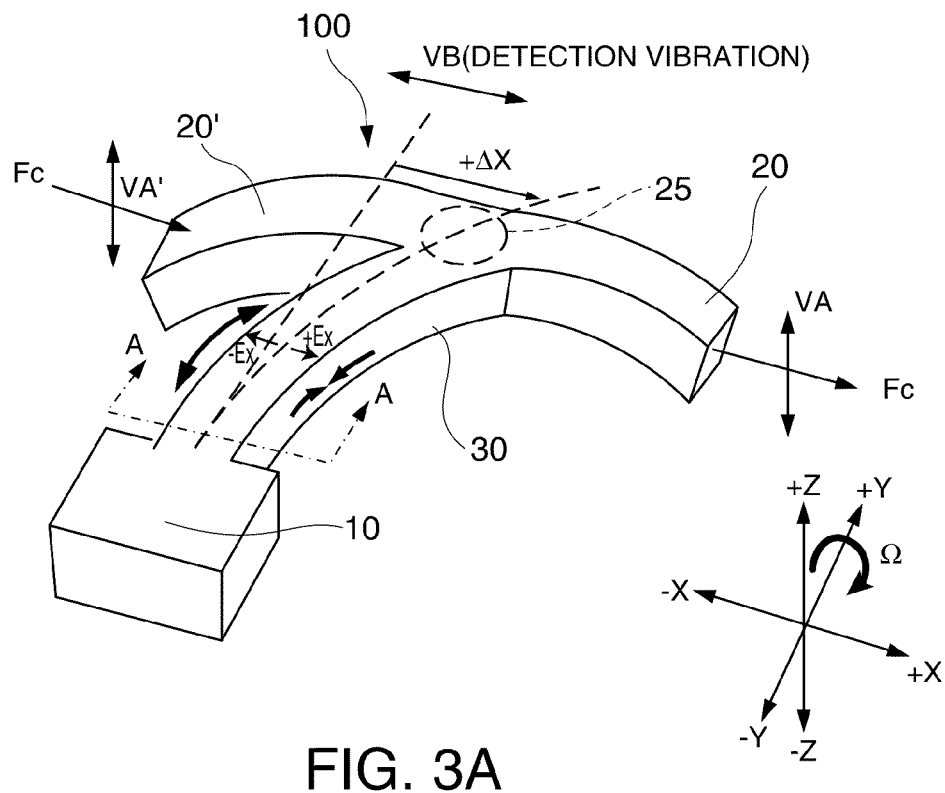
FIGS. 3A and 3B are diagrams for explaining the detection principle of the physical quantity of the vibration gyro element.
Figure 3B:
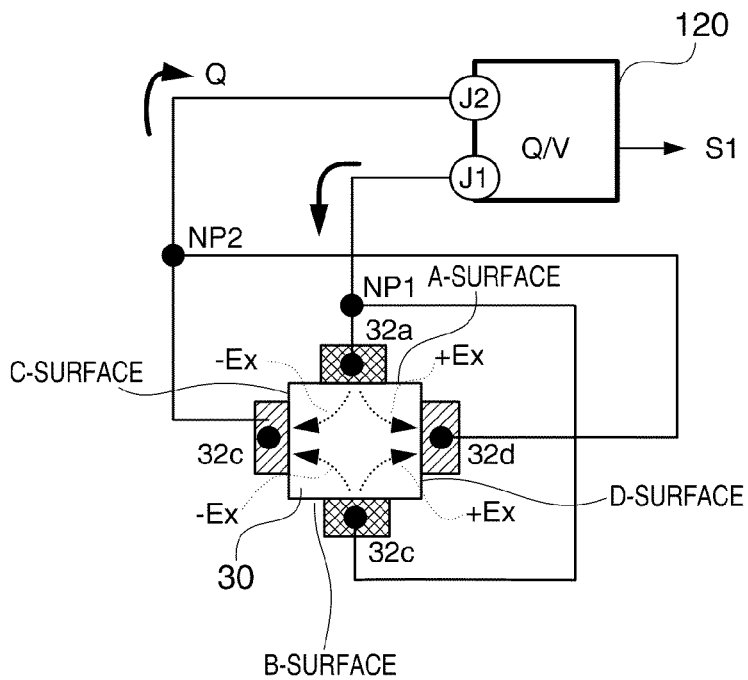

FIGS. 3A and 3B are diagrams for explaining the detection principle of the physical quantity of the vibration gyro element. FIG. 3A is a diagram showing another example of the vibrating posture of the arms, and FIG. 3B is a diagram showing the detection operation of the electrical signal. FIGS. 3A and 3B correspond respectively to FIGS. 2A and 2B.

In the example shown in FIG. 3A, the first drive arm 20 is bent in the positive third direction (the +Z-axis direction) due to the driving vibration VA in the out-of-plane direction, and similarly, the second drive arm 20' is bent in the positive third direction (+Z-axis direction) due to the driving vibration VA' in the out-of-plane direction. In this state, when the angular velocity Ω acts around the axis (the +Y-axis direction) in the first direction, the Coriolis force Fc is generated in the positive second direction (+X-axis direction).

Thus, the first drive arm 20 and the second drive arm 20' are displaced in the positive second direction (+X-axis direction). This displacement is transferred to the detection arm 30 via the joint section 25, and the detection arm 30 is also displaced in the positive second direction (the +X-axis direction). In other wards, the displacement of −ΔX is caused in the detection arm 30. Thus, the detection vibration VB is caused in the detection arm 30. In the example shown in FIG. 3A, the direction of the detection vibration VB is the positive second direction (the +X-axis direction).

When the detection vibration VB is generated in the detection arm 30, as explained previously, the electrical fields Ex (+Ex and −Ex) in the second direction are generated due to the piezoelectric constant d12 of the quartz crystal, and the migration of the charge Q occurs in accordance therewith.

Specifically, the migration of the charge Q occurs in the direction (the direction from the terminal J1 toward the terminal J2) indicated by the arrow in FIG. 3B. The minute current signal (the charge signal) caused by the migration of the charge is converted into the voltage by the Q/V conversion circuit 120 disposed in the anterior stage of the detection circuit. The physical quantity (the angular velocity) is detected based on the voltage signal.

Since the vibration gyro element 100 explained hereinabove uses the out-of-plane vibration (the vibration of a "walk" mode) as the driving vibration, the amplitude of the vibration can easily be made larger compared to the case of using the conventional in-plane driving vibration (since no other arm exists adjacent thereto, the amplitude is not limited by another arm, and therefore, the amplitude can be increased within the range in which the mechanical durability is assured).

Further, since the first drive arm 20 and the second drive arm 20' are disposed along the fundamental crystal axis of the quartz crystal plate (the piezoelectric plate), the first and second drive arms can be processed with accuracy using, for example, photolithography.

Further, in the vibration (the out-of-plane vibration) of the "walk" mode, the displacement in the positive third direction (+Z-axis direction) and the displacement in the negative third direction (−Z-axis direction) occur in a balanced manner. In other words, the driving vibration VA of the first drive arm 20 and the driving vibration VA' in the second drive arm 20' are in balance with each other. This makes a contribution to improving the detection efficiency of the physical quantity (e.g., the angular velocity or the angular acceleration).

Further, since the drive arms (20, 20') and the detection arm 30 are separated from each other, the electrode arrangement and the wiring in each of the arms can reasonably be performed. Further, since the drive arms (20, 20') and the detection arm 30 are separated from each other, the influence of the capacitive coupling or the electromechanical coupling can also be reduced.

Further, since the driving vibration VA of the first drive arm 20 and the driving vibration VA' of the second drive arm 20' are balanced with each other, it is also possible to efficiently cancel out the unwanted driving vibration component leaking from each of the drive arms into the detection arm due to the mechanical coupling. It should be noted that the capacitive coupling, the electromechanical coupling, and the mechanical coupling will be described later with reference to FIG. 17.

Further, by forming the base section 10, the drive arms (20, 20'), and the detection arm 30 themselves using the quartz crystal plate, exciting the driving vibration using the piezoelectric constant the quartz crystal plate itself has, and then detecting the detection signal (the electrical signal) using the piezoelectric constant the quartz crystal plate itself has, it is possible to reduce the vibration loss and to improve the durability compared to the structure of forming the piezoelectric film on the base material.

Figure 4A:
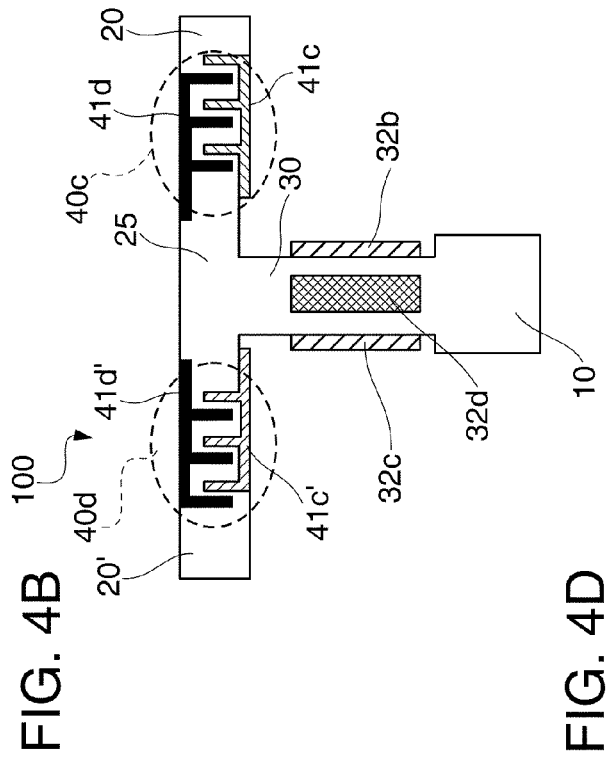
FIGS. 4A through 4D are diagrams showing an arrangement example of the electrodes.
Figure 4B:
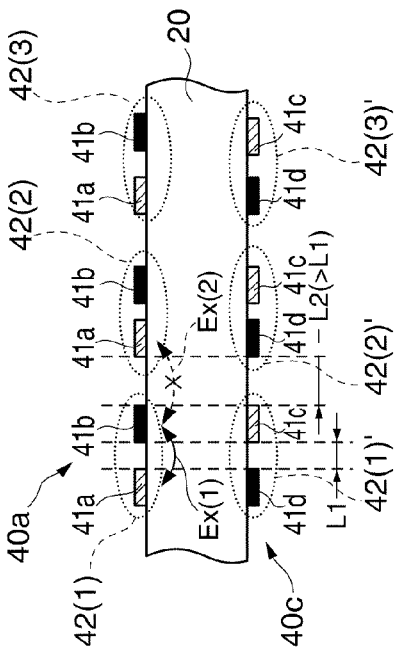
Figure 4C:
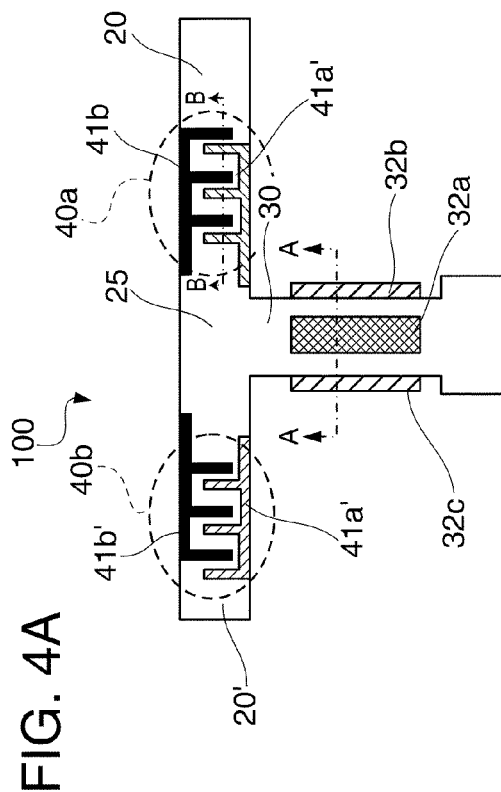
Figure 4D:
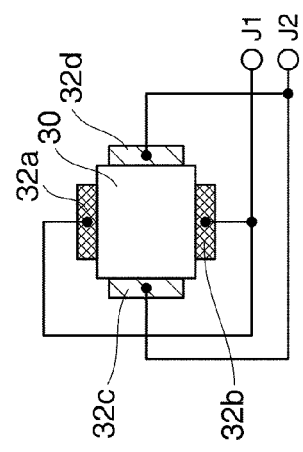

FIGS. 4A through 4D are diagrams showing an arrangement example of the electrodes. FIG. 4A is a diagram showing the electrode arrangement on the first surface (the obverse surface) of the vibration gyro element 100. FIG. 4B is a perspective diagram showing the electrode arrangement on the second surface (the reverse surface) of the vibration gyro element 100. FIG. 4C is a cross-sectional view along the line A-A shown in FIG. 4A. FIG. 4D is a cross-sectional view along the line B-B shown in FIG. 4A.

Firstly, drive electrodes (inter digital transducers) provided to the drive arm 20 will be explained. The drive arm 20 has a pair of principal surfaces (the first surface (the obverse surface) and the second surface (the reverse surface)). An inter digital transducer is formed on at least one of the pair of principal surfaces. In the present embodiment, the inter digital transducers are formed on both of the first surface (the obverse surface) and the second surface (the reverse surface).

As indicated by surrounding with a thick dotted line in FIG. 4A, the first surface (the obverse surface) of the first drive arm 20 is provided with the inter digital transducer (the IDT electrode) 40a. The inter digital transducer 40a has an electrode 41a (the electrode with hatching) and an electrode 41b (the blackened electrode).

Similarly, the first surface (the obverse surface) of the second drive arm 20' is provided with the inter digital transducer (the IDT electrode) 40b. The inter digital transducer 40b has an electrode 41a' (the electrode with hatching) and an electrode 41b' (the blackened electrode).

Further, as indicated by surrounding with a thick dotted line in FIG. 4B, the second surface (the reverse surface) of the first drive arm 20 is provided with the inter digital transducer 40c. The inter digital transducer 40c has an electrode 41c (the electrode with hatching) and an electrode 41d (the blackened electrode). The electrode 41c is connected to the electrode 41a. Further, the electrode 41d is connected to the electrode 41b.

Similarly, the second surface (the reverse surface) of the second drive arm 20' is provided with the inter digital transducer (the IDT electrode) 41d. The inter digital transducer 41d has an electrode 41c' (the electrode with hatching) and an electrode 41d' (the blackened electrode).

Here, FIG. 4D is referred to. The inter digital transducer 40a (the inter digital transducer disposed on the surface thereof) as the first drive electrode provided to the first drive arm 20 has a first opposed portion 42(1) composed of a pair of electrodes (the electrode 41a and the electrode 41b) disposed so as to be opposed to each other with a predetermined distance L1, a second opposed portion 42(2) disposed adjacent to the first opposed portion 42(1) and composed of a pair of electrodes (41a, 41b) disposed so as to be opposed to each other with the predetermined distance L1, and a third opposed portion 42(3) disposed adjacent to the second opposed portion 42(2) and composed of a pair of electrodes (41a, 41b) disposed so as to be opposed to each other with the predetermined distance L1.

Each of the first through third opposed portions 41(1) through 42(3) is disposed along the second direction (the X-axis direction), which is the extending direction of the drive arm 20. Further, assuming that the distance (or the distance between the second opposed portion 42(2) and the third opposed portion 42(3)) between the first opposed portion 42(1) and the second opposed portion 42(2) is L2, L1<L2 becomes true.

The condition of L1<L2 is set for the following reason. In the explanation described hereinafter, attention is focused on the first opposed portion 42(1) and the second opposed portion 42(2). In each of the first opposed portion 42(1) and the second opposed portion 42(2), an electrical field (an effective electrical field) Ex(1) is generated between the pair of electrodes (41a, 41b) opposed to each other, and the electrical field (the effective electrical field) Ex(1) is applied to the drive arm 20 to thereby cause the contraction or expansion (tension) stress in the drive arm 20.

Meanwhile, an electrical field (an ineffective electrical field) Ex(2) is also generated between the electrode 41b on the side of the second opposed portion in the first opposed portion 42(1) and the electrode 41a on the side of the first opposed portion of the second opposed portion 42(2). In the case in which the direction of the effective electrical field Ex(1) generated in each of the first opposed portion 42(1) and the second opposed portion 42(2) and the direction of the ineffective electrical field Ex(2) generated between the first opposed portion 42(1) and the second opposed portion 42(2) are opposite to each other, there is caused a problem that a part of the effective electrical field Ex(1) is canceled out with the ineffective electrical field Ex(2).

Therefore, in the example shown in FIG. 4D, the distance (L2; specifically, the distance between the electrode 41b of the first opposed portion located on the side of the second opposed portion and the electrode 41a of the second opposed portion located on the side of the first opposed portion) between the first opposed portion 42(1) and the second opposed portion 42(2) is set to be larger than the distance L1 between the electrodes in each of the first opposed portion 42(1) and the second opposed portion 42(2). Thus, it is possible to reduce the harmful influence (i.e., the cancellation of a part of the effective electrical field Ex(1) with the ineffective electrical field Ex(2)) exerted by the ineffective electrical field Ex(2) generated between the first opposed portion 42(1) and the second opposed portion 42(2).

Then, the arrangement of the detection electrode in the detection arm 30 will be explained. Here, FIG. 4C is referred to. As explained above, the detection arm 30 has the first surface (the obverse surface, the A-surface), the second surface (the reverse surface, the B-surface), the third surface (the left side surface, the C-surface) connecting the first surface and the second surface, and the fourth surface (the right side surface, the D-surface) opposed to the third surface.

The detection electrode has a first electrode 32a disposed on the first surface (the A-surface) of the detection arm 30, a second electrode 32b disposed on the second surface (the B-surface) of the detection arm 30 and connected to the first electrode 32a, a third electrode 32c disposed on the third surface (the C-surface) of the detection arm 30 and electrically isolated from the first electrode 32a and the second electrode 32b, and a fourth electrode 32d disposed on the fourth surface (the D-surface) of the detection arm 30 and connected to the third electrode 32c. It is assumed that the common connection point between the first electrode 32a and the second electrode 32b is J1. It is also assumed that the common connection point between the third electrode 32c and the fourth electrode 32d is J2. The common connection points J1 and J2 correspond to the input terminals of the detection circuit.

Figure 5:
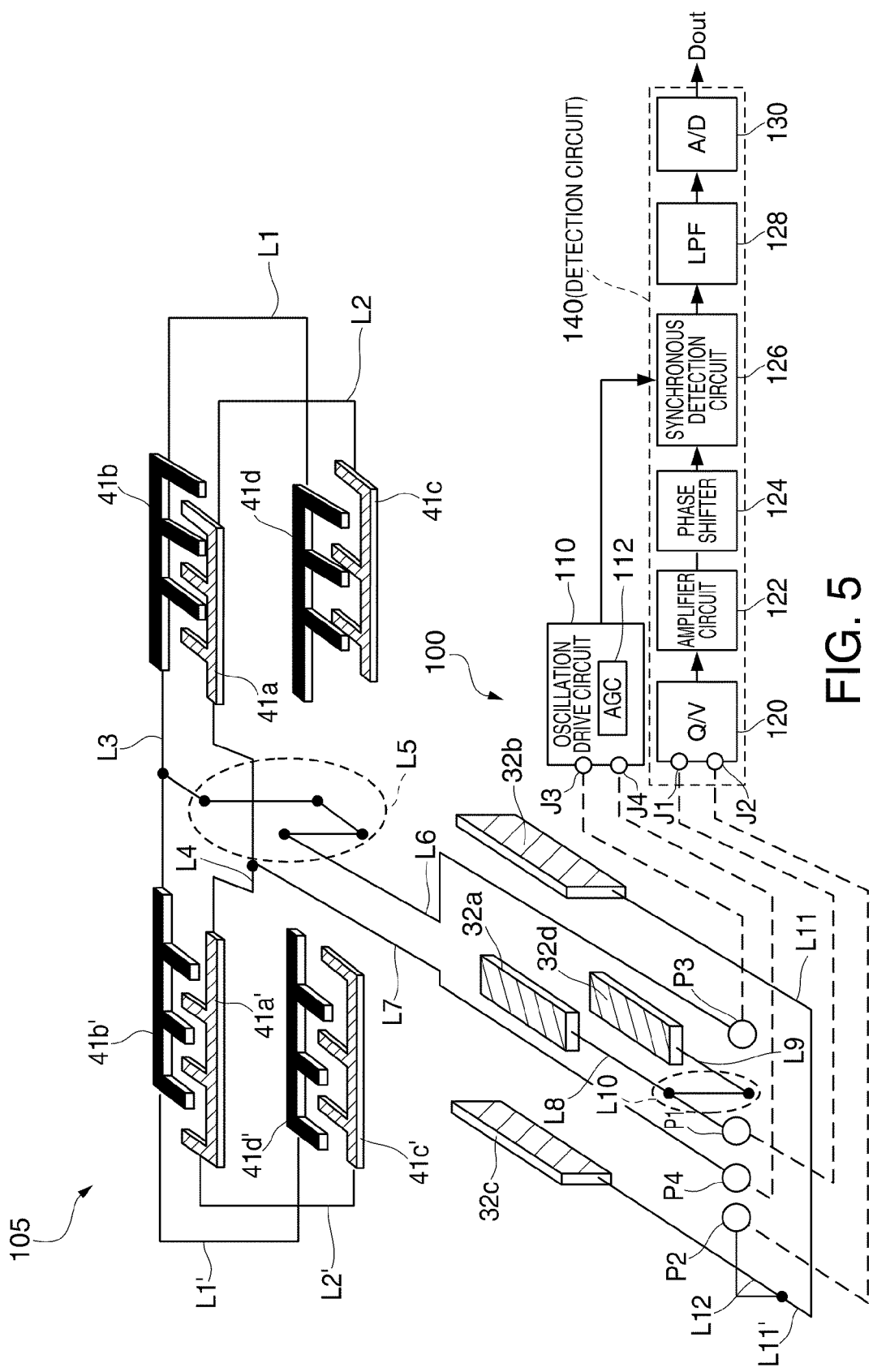
FIG. 5 is a diagram showing an example of a configuration of the vibration gyro sensor.

FIG. 5 is a diagram showing an example of a configuration of the vibration gyro sensor. In FIG. 5, the vibration gyro sensor 105 has the vibration gyro element 100, an oscillation drive circuit 110, and a detection circuit 140. The oscillation drive circuit 110 has an AGC circuit 112. Input terminals J3, J4 of the oscillation drive circuit 110 are connected respectively to a pad P3 and a pad P4 provided to the base section 10 of the vibration gyro element 100.

Further, the detection circuit 140 has a Q/V conversion circuit 120, an amplifier circuit 122, a phase shifter 124, a synchronous detection circuit 126, a low pass filter (LPF) 128, and an A/D converter circuit 130. Input terminals J1, J2 of the detection circuit 140 are connected respectively to a pad P1 and a pad P2 provided to the base section 10 of the vibration gyro element 100.

In the present embodiment, the unwanted driving vibration component (the mechanical coupling) is sufficiently reduced. If the unwanted driving vibration component can be reduced to the level with no practical problem, it is possible to set the amplitude of the first stage of the Q/V conversion circuit and the amplifier circuit to be higher, and the amplitude of the posterior stage thereof to be lower, and therefore, the noise generated in the detection circuit can be reduced. Therefore, it is possible to realize a low-noise gyro sensor.

Further, in FIG. 5, the reference symbols L1 through L11, and L1' through L11' each denote the wiring line formed of a semiconductor material. These wiring lines can be formed on either of the first surface, the second surface, the third surface, and the fourth surface according to needs. It should be noted that the wiring lines L5 and L10 indicated by surrounding with dotted lines are bypass wiring lines passing through via holes.

Figure 6:
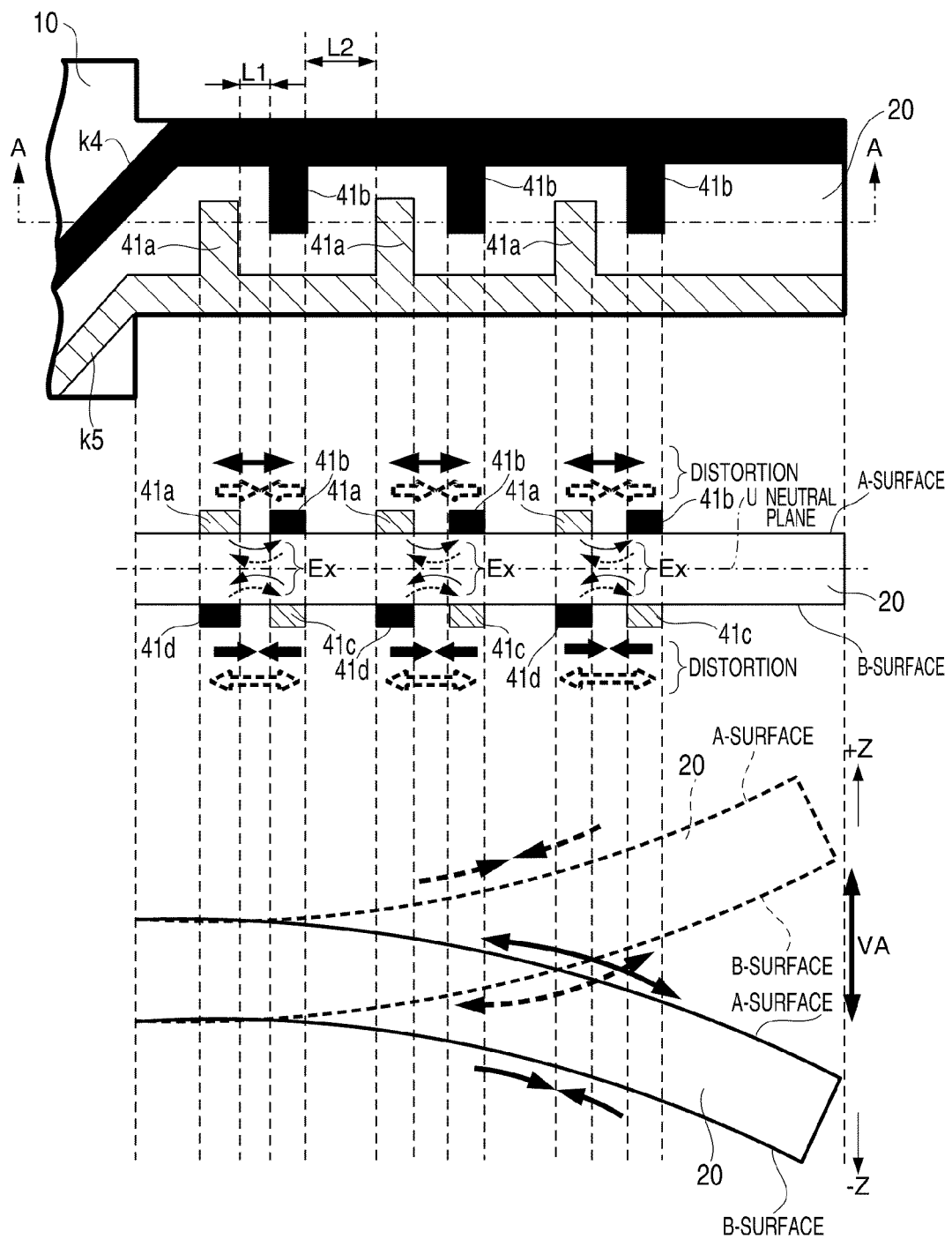
FIG. 6 is a diagram for explaining an example of excitation of the driving vibration.

FIG. 6 is a diagram for explaining an example of excitation of the driving vibration. The upper side of FIG. 6 shows a plan view of the drive arm 20, the cross-sectional view of the drive arm 20 along the line A-A is shown in the middle of the drawing, and the lower side thereof shows how the drive arm 20 vibrates in the out-of-plane direction. As shown in the drawing, due to the electrical field Ex in the second direction (the X-axis direction) caused by the inter digital transducer, there is caused a distortion (stress) in the first surface (the A-surface) and the second surface (the B-surface) of the drive arm 20. In the case in which the contraction stress is generated in the first surface (the A-surface) and the expansion (tension) stress is generated in the second surface, the drive arm 20 is bent in the positive third direction (the +Z direction). In contrast, in the case in which the expansion (tension) stress is generated in the first surface (the A-surface) and the contraction stress is generated in the second surface, the drive arm 20 is bent in the negative third direction (the −Z direction). The bend in the positive third direction (the +Z direction) and the bend in the negative third direction (the −Z direction) occur alternately. Therefore, the driving vibration (the out-of-plane vibration or the "walk" mode vibration) in the third direction (the Z direction perpendicular to the X-Y plane) occurs steadily.

Figure 17:
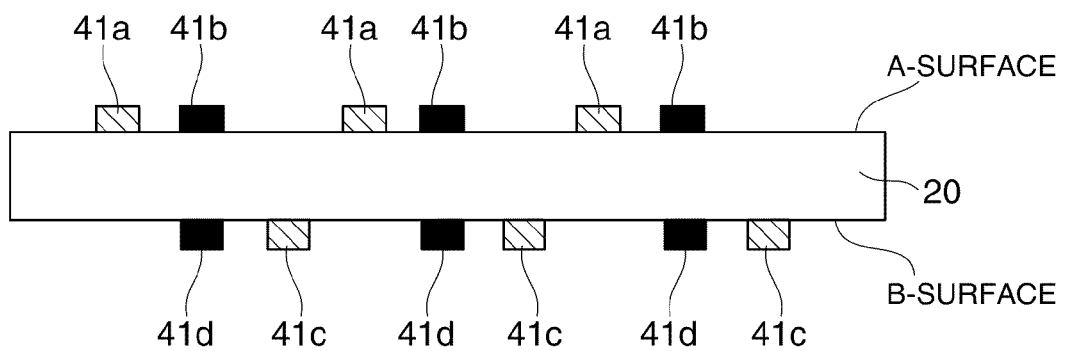
FIG. 17 is a diagram for explaining another example of excitation of the driving vibration.

It should be noted that the arrangement of the drive electrodes shown in the middle of FIG. 6 is nothing more than an example, and the arrangement is not limited to one shown in FIG. 6. Here, FIG. 17 is referred to. FIG. 17 is a diagram for explaining another example of excitation of the driving vibration.

In the example shown in FIG. 17, one electrode 41b (the blackened electrode) of a pair of electrodes of the inter digital transducer disposed on the first surface (the A-surface) of the drive arm 20 and one electrode 41d (the blackened electrode, having the same electrical potential as that of the electrode 41b) of a pair of electrodes of the inter digital transducer disposed on the second surface (the B-surface) of the drive arm 20 are disposed so as to be opposed to each other.

It is assumed, for example, that the polarity of the electrical potential of the electrodes 41b, 41d (the blackened electrodes) is "+," and the polarity of the electrical potential of the electrodes 41a, 41c (the hatched electrodes) is "−." The sequence of the polarity of the electrodes of the inter digital transducer disposed on the first surface (the A-surface) is "+, −, +, −, +" along the direction away from the base section (the left end of the drawing) starting from the electrode 41b. Further, the sequence of the polarity of the electrodes of the inter digital transducer disposed on the second surface (the B-surface) is "+, −, +, −, +, −" along the direction away from the base section (the left end of the drawing) starting from the electrode 41d opposed to the electrode 41b. As described above, in consideration of the sequence taking the electrodes opposed to each other as the origin, it results that the sequence of the polarity of the electrodes of the inter digital transducer on the first surface (the A-surface) and the sequence of the polarity of the electrodes of the inter digital transducer on the second surface (the B-surface) conform to each other.

According to such an electrode arrangement, it becomes hard to generate the wasteful vertical electrical field between the first surface (the A-surface) and the second surface (the B-surface). Therefore, the unnecessary distortion can be prevented from occurring in the drive arm 20. Further, since the wasteful electrical field is reduced, the power consumption can also be reduced.

Here, going back to FIGS. 7A through 7G, the explanation is continued therefrom. The reason of the fact that according to the present embodiment the influence of the mechanical coupling can sufficiently be reduced will hereinafter be explained. FIGS. 7A through 7G are diagrams for explaining the reason of the fact that the influence of the mechanical coupling can be reduced.

As explained above, ideally, the driving vibrations VA, VA' in the third direction (the Z-axis direction) are generated in the first drive arm 20 and the second drive arm 20', respectively. It should be noted that the vibration component in the direction other than the third direction (the Z-axis direction) is also mixed in the actual driving vibration.

Figures 7A, 7B:
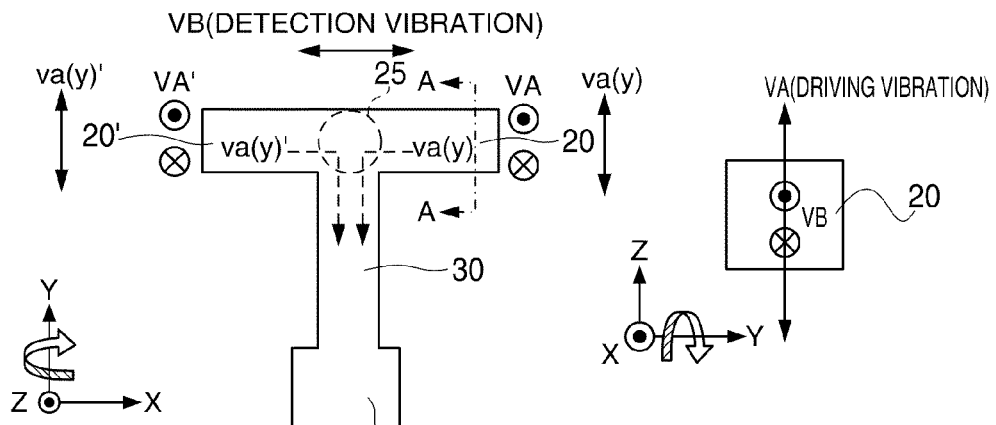
FIGS. 7A through 7G are diagrams for explaining the reason of the fact that the influence of the mechanical coupling can be reduced.

FIGS. 7B through 7E respectively show examples of the cross-sectional view of the first drive arm along the line A-A in FIG. 7A. As shown in FIG. 7B, if the cross-sectional shape of the first drive arm 20 is ideally axisymmetric, the driving vibration VA occurs in the third direction (the Z-axis direction). If the driving vibration VA is ideal, the unnecessary driving vibration component leaking into the detection arm 30 hardly occurs.

Figures 7C, 7D, 7E:
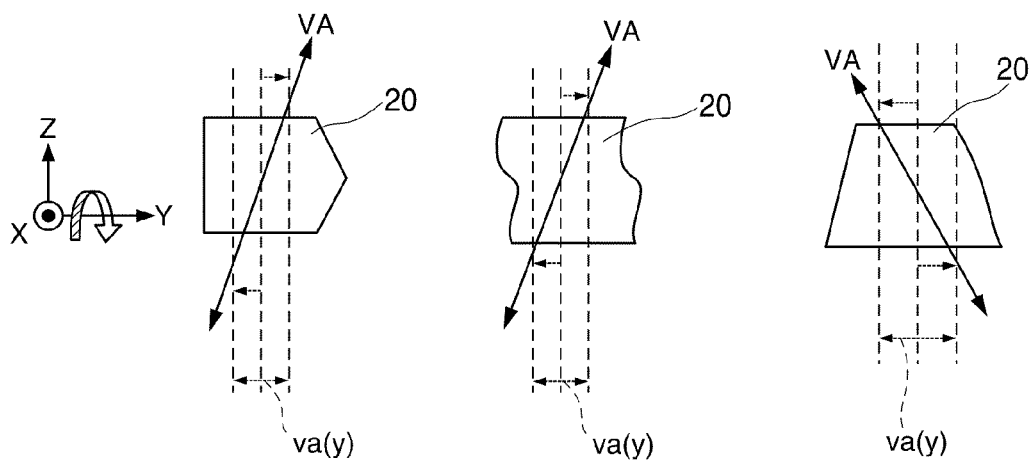

However, in reality, as shown in FIGS. 7C through 7E, the cross-sectional shape of the first drive arm 20 fails to become axisymmetric due to the machining error, and therefore, the unnecessary driving vibration component va(y) is caused in the first direction (the Y-axis direction). Although in the explanation hereinabove, the driving vibration VA with respect to the first drive arm 20 is cited as an example, the unnecessary driving vibration component va(y)' is also caused in the driving vibration VA' with respect to the second drive arm 20' in substantially the same manner.

As shown in FIG. 7A, the unnecessary driving vibration component va(y) leaks from the first drive arm 20 into the detection arm 30 due to the mechanical coupling. Further, the unnecessary driving vibration component va(y)' leaks from the second drive arm 20' into the detection arm 30 due to the mechanical coupling.

Figures 7F, 7G:
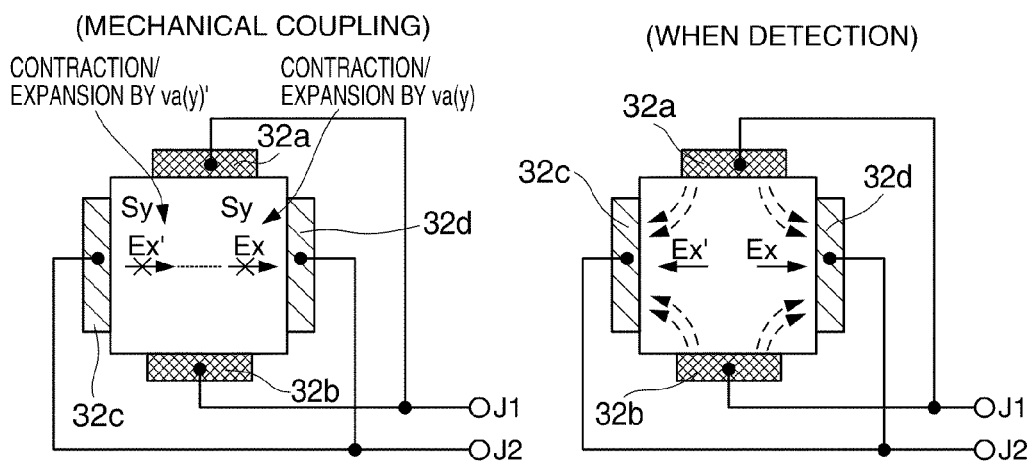

On this occasion, as shown in FIG. 7F, the distortion Sy in the first direction occurs in the piezoelectric member (the quartz crystal) constituting the detection arm 30, the electrical field Ex' is urged to be generated on the third electrode 32c side of the detection arm 30, and the electrical field Ex is urged to be generated on the fourth electrode 32d side of the detection arm 30 due to the piezoelectric constant d12. The directions of the electrical fields Ex', Ex are the same (i.e., the direction from the third electrode 32c toward the fourth electrode 32d).

However, in reality, the third electrode 32c and the fourth electrode 32d are commonly connected to have the same electrical potential and cause no potential difference, and therefore, the electrical fields Ex', Ex due to the piezoelectric constant d12 are not generated, and the migration of the charge does not occur. It should be noted that in the case of the normal detection operation, the vibration in the second direction (the X-axis direction) occurs, and the electrical fields +Ex, −Ex having the directions opposite to each other are generated as shown in FIG. 7G, for example, and therefore, the migration of the charge occurs between the first electrode 32a and the second electrode 32b and between the third electrode 32c and the fourth electrode 32d.

Specifically, the driving vibration components va(y) and va(y)' in the Y-axis direction from the first drive arm 20 and the second drive arm 20' are propagated to the detection arm 30 via the joint section 25, but are canceled out to each other because the directions of the resulted stresses are the same, and therefore, it results that the unnecessary driving vibration component is not output from the detection electrodes (32a through 32d). In other words, the detection system blind with respect to the vibration component in the first direction (the Y-axis direction) due to the mechanical coupling is realized.

In particular, in the present embodiment, the first drive arm 20 and the second drive arm 20' are disposed along the fundamental crystal axis of the quartz crystal plate (the piezoelectric plate), and therefore, can be processed with accuracy using, for example, photolithography. Further, in the vibration (the out-of-plane vibration) of the "walk" mode, since the displacement in the positive third direction (the +Z-axis direction) and the displacement in the negative third direction (the −Z-axis direction) occur in a balanced manner, the driving vibration VA of the first drive arm 20 and the driving vibration VA' of the second drive arm 20' are balanced with each other. Therefore, the effect of canceling out the unnecessary driving vibration component is high, and it is possible to make the noise signal sufficiently small.

Second Embodiment

In the present embodiment, the number of detection arms and the number of drive arms are increased, and the balanced driving vibration in the "walk" mode is excited in each of the drive arms, thereby improving the detection sensitivity of physical quantities.

Figure 8:
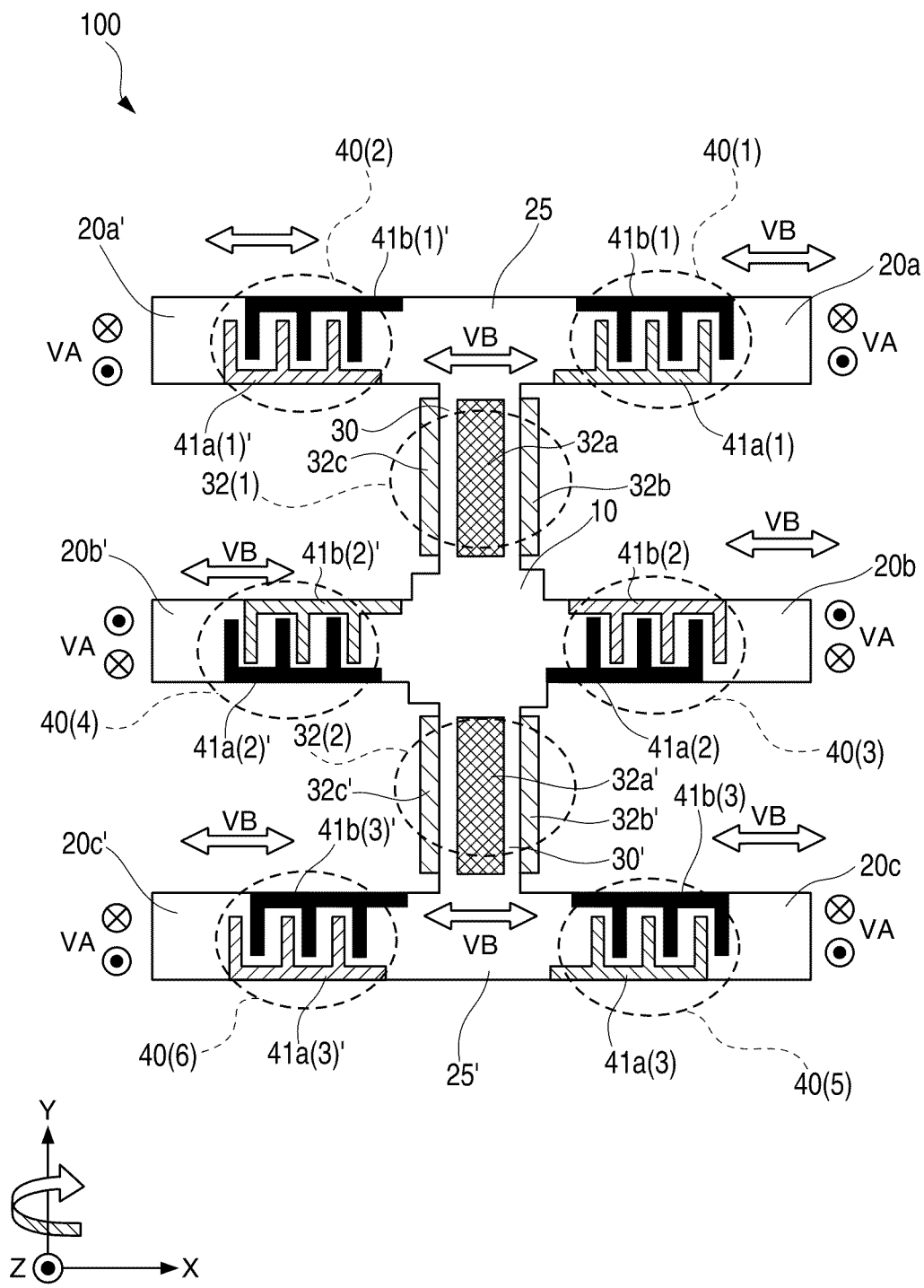
FIG. 8 is a diagram showing a configuration of the vibration gyro element according to a second embodiment of the invention.

FIG. 8 is a diagram showing a configuration of the vibration gyro element according to the second embodiment of the invention. The vibration gyro element 100 shown in FIG. 8 includes the base section 10, a first detection arm 30 extending from the base section 10 in a predetermined plane (here, the X-Y plane including the Z-plane of the quartz crystal) in the positive first direction (the +Y-axis direction), a second detection arm 30' extending from the base section 10 in the predetermined plane in the negative first direction (the −Y-axis direction) opposite to the positive first direction, a first drive arm 20a extending from the joint section 25 of the first detection arm 30 in the positive second direction (the +X-axis direction), a second drive arm 20a' extending from the joint section 25 of the first detection arm 30 in the negative second direction (the −X-axis direction), a third drive arm 20b extending from the base section 10 in the positive second direction (the +X-axis direction), a fourth drive arm 20b' extending from the base section 10 in the negative second direction (the −X-axis direction), a fifth drive arm 20c extending from the joint section 25' of the second detection arm 30' in the positive second direction (the +X-axis direction), a sixth drive arm 20c' extending from the joint section 25' of the second detection arm 30' in the negative second direction (the −X-axis direction), a first drive electrode 40(1) provided to the first drive arm 20a, a second drive electrode 40(2) provided to the second drive arm 20a', a third drive electrode 40(3) provided to the third drive arm 20b, a fourth drive electrode 40(4) provided to the fourth drive arm 20b', a fifth drive electrode 40(5) provided to the fifth drive arm 20c, a sixth drive electrode 40(6) provided to the sixth drive arm 20c', first detection electrodes (32a through 32d) provided to the first detection arm 30, and second detection electrodes (32a' through 32d') provided to the second detection arm 30'.

The first drive electrode 40(1) is a first inter digital transducer (including an electrode 41a(1) and an electrode 41b(1)) provided to at least one (in the present embodiment, each of both principal surfaces) of the pair of principal surfaces in the first drive arm 20a, the second drive electrode 40(2) is a second inter digital transducer (including an electrode 41a(1)' and an electrode 41b(1)') provided to at least one (in the present embodiment, each of both principal surfaces) of the pair of principal surfaces in the second drive arm 20a', the third drive electrode 40(3) is a third inter digital transducer (including an electrode 41a(2) and an electrode 41b(2)) provided to at least one (in the present embodiment, each of both principal surfaces) of the pair of principal surfaces in the third drive arm 20b, the fourth drive electrode 40(4) is a fourth inter digital transducer (including an electrode 41a(2)' and an electrode 41b(2)') provided to at least one (in the present embodiment, each of both principal surfaces) of the pair of principal surfaces in the fourth drive arm 20b', the fifth drive electrode 40(5) is a fifth inter digital transducer (including an electrode 41a(3) and an electrode 41b(3)) provided to at least one (in the present embodiment, each of both principal surfaces) of the pair of principal surfaces in the fifth drive arm 20c, and the sixth drive electrode 40(6) is a sixth inter digital transducer (including an electrode 41a(3)' and an electrode 41b(3)') provided to at least one (in the present embodiment, each of both principal surfaces) of the pair of principal surfaces in the sixth drive arm 20c'.

Figures 9A, 9B:
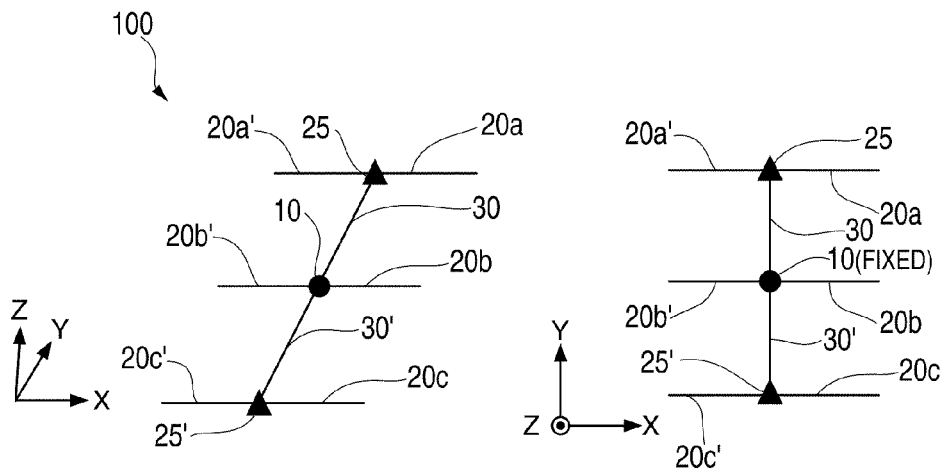
FIGS. 9A through 9F are diagrams showing examples of the vibration posture of the vibration gyro element shown in FIG. 8.
Figures 9C, 9D:
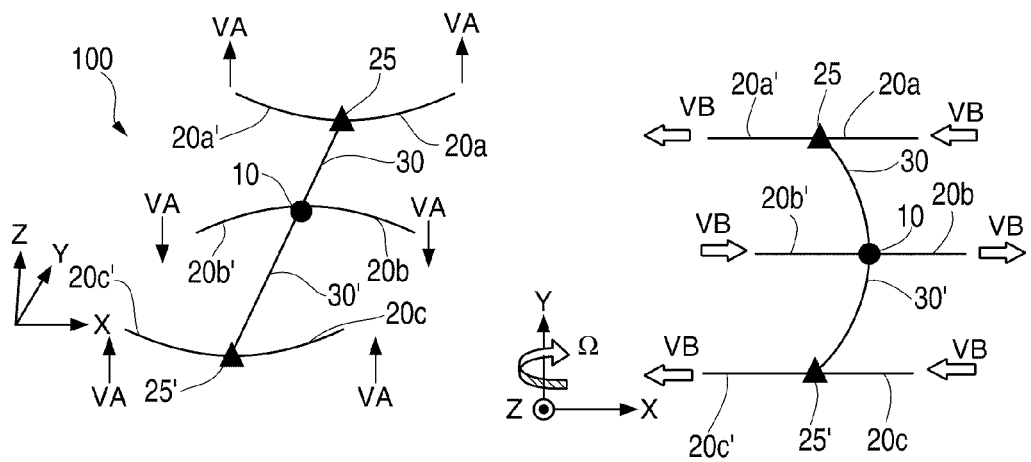
Figures 9E, 9F:
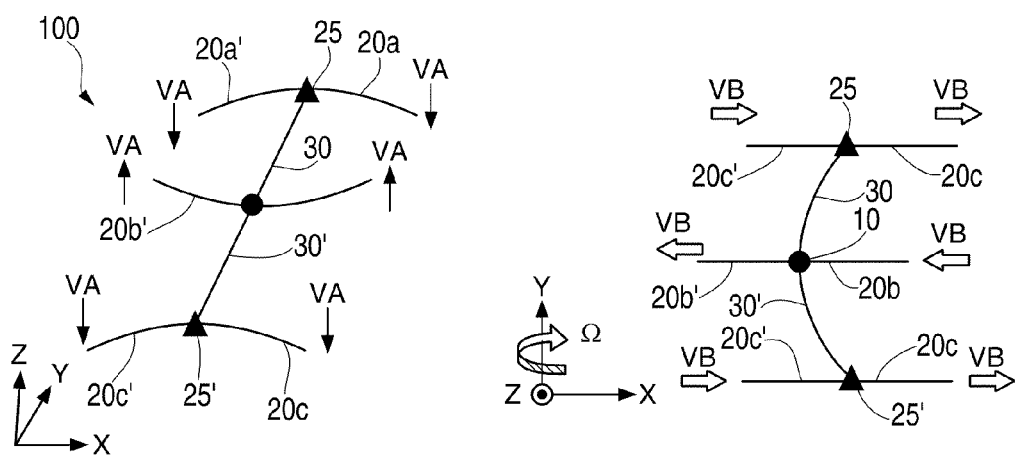

FIGS. 9A through 9F are diagrams showing examples of the vibration posture of the vibration gyro element shown in FIG. 8. FIGS. 9A, 9C, and 9E are perspective views showing only the appearance of the driving vibrations VA, VA'. FIGS. 9B, 9D, and 9F are plan views (i.e., the diagrams showing the displacement state of the arms in a plan view) showing only the bending state of each of the arms due to the detection vibration VB. Further, FIG. 9B corresponds to FIG. 9A, FIG. 9D corresponds to FIG. 9C, and FIG. 9F corresponds to FIG. 9E.

In FIGS. 9A and 9B, the vibration gyro element 100 is in a rest state. In FIG. 9C, the first drive arm 20a, the second drive arm 20a', the fifth drive arm 20c, and the sixth drive arm 20c' are bent in the positive third direction (the +Z-axis direction) due to the driving vibrations VA, VA'. In contrast, the third drive arm 20b and the fourth drive arm 20b' are bent in the negative third direction (−Z-axis direction) due to the driving vibrations VA, VA'.

In FIG. 9D, the angular velocity Ω is generated around the axis (the +Y-axis) in the positive first direction, and thus the arms other than the third drive arm 20b and the fourth drive arm 20b' are displaced in the negative second direction (the −X-axis direction) due to the detection vibration VB. Although the Coriolis force in the positive second direction (the +X-axis direction) also acts on the third drive arm 20b and the fourth drive arm 20b', since the base section 10 is fixed, no displacement occurs in the third drive arm 20b and the fourth drive arm 20b'.

In FIG. 9E, the first drive arm 20a, the second drive arm 20a', the fifth drive arm 20c, and the sixth drive arm 20c' are bent in the negative third direction (the −Z-axis direction) due to the driving vibrations VA, VA'. In contrast, the third drive arm 20b and the fourth drive arm 20b' are bent in the positive third direction (+Z-axis direction) due to the driving vibrations VA, VA'.

In FIG. 9F, the angular velocity Ω is generated around the axis (the +Y-axis) in the positive first direction, and thus the arms other than the third drive arm 20b and the fourth drive arm 20b' are displaced in the positive second direction (the +X-axis direction) due to the detection vibration VB. Although the Coriolis force in the negative second direction (the −X-axis direction) also acts on the third drive arm 20b and the fourth drive arm 20b', since the base section 10 is fixed, no displacement occurs in the third drive arm 20b and the fourth drive arm 20b'.

In the present embodiment, the driving vibration in the "walk" mode is excited in each of the first drive arm 20a, the second drive arm 20a', the fifth drive arm 20c, and the sixth drive arm 20c' in the third direction (the Z-axis direction) and so that the direction of the displacement is the same between the arms. In contrast, the driving vibration in the "walk" mode is excited in each of the third drive arm 20b and the fourth drive arm 20b' in the third direction (the Z-axis direction) and so that the direction of the displacement is opposite to the direction of the displacement of each of the first drive arm 20a, the second drive arm 20a', the fifth drive arm 20c, and the sixth drive arm 20c'.

In other words, out of the three pairs of drive arms, the two pairs of drive arms located on the both sides are driven in phase, while the pair of drive arms located at the center is driven in reverse phase, and thus the dynamically-balanced driving vibration can be realized. Since the out-of-plane vibration is well-balanced, the Q-value of the resonance is increased, the amplitude of the driving vibration is increased, and the vibration frequency can also be stabilized. Therefore, the vibration gyro element with a higher sensitivity and a higher stability of the sensitivity can be realized.

Further, since the two detection arms (the first detection arm 30 and the second detection arm 30') are provided, the amount of charge to be migrated by the electrical field is increased, and the detection sensitivity can be improved.

Figures 10A, 10B:
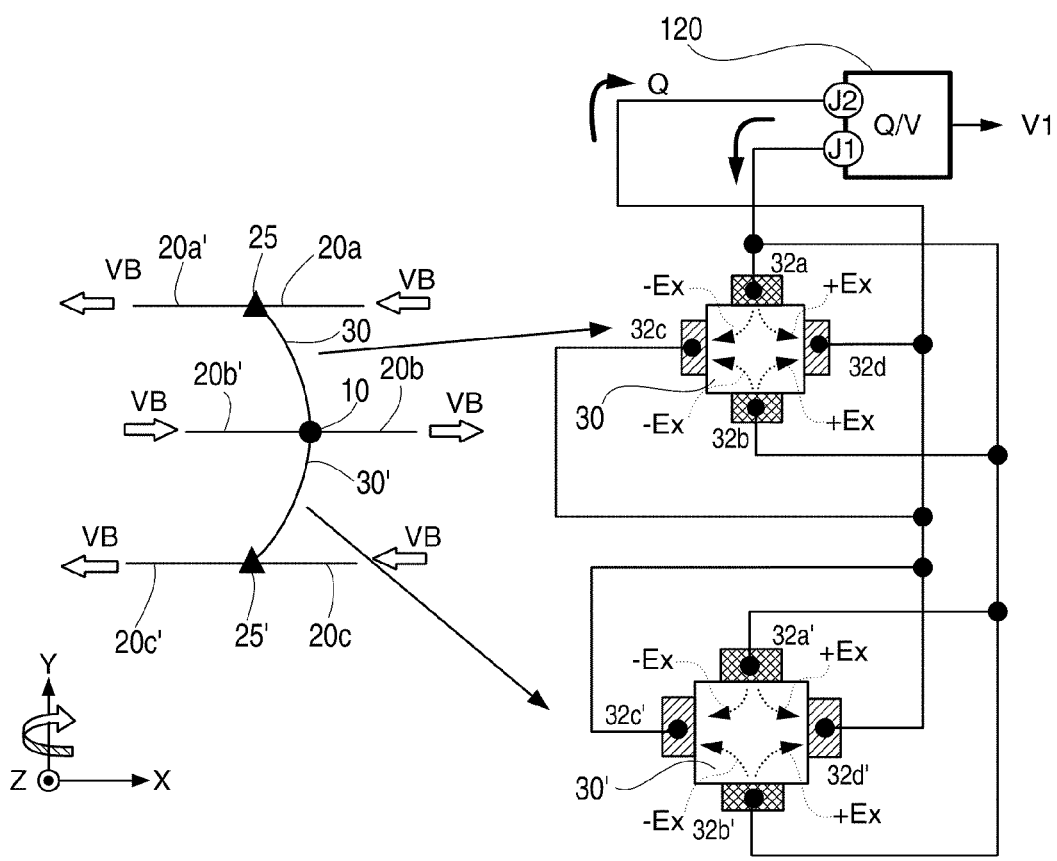
FIGS. 10A and 10B are diagrams for explaining the detection operation of the physical quantity in the vibration gyro sensor according to the second embodiment.

FIGS. 10A and 10B are diagrams for explaining the detection operation of the physical quantity in the vibration gyro sensor according to the second embodiment. In the condition in which the displacement shown in FIG. 10A occurs in each of the arms, the charge Q migrates in the direction (the direction from the terminal J1 toward the terminal J2) indicated by the arrows shown in FIG. 10B.

Specifically, as shown in FIG. 10B, the first electrode 32a for the first detection arm is disposed on the first surface (the obverse surface) of the first detection arm 30. The second surface (the reverse surface) of the first detection arm 30 is provided with the second electrode 32b for the first detection arm. The third surface (the left side surface) of the first detection arm 30 is provided with the third electrode 32c for the first detection arm. The fourth surface (the right side surface) of the first detection arm 30 is provided with the fourth electrode 32d for the first detection arm.

Further, the first surface (the obverse surface) of the second detection arm 30' is provided with the first electrode 32a' for the second detection arm. The second surface (the reverse surface) of the second detection arm 30' is provided with the second electrode 32b' for the second detection arm. The third surface (the left side surface) of the second detection arm 30' is provided with the third electrode 32c' for the second detection arm. The fourth surface (the right side surface) of the second detection arm 30' is provided with the fourth electrode 32d' for the second detection arm.

Further, the first electrode 32a for the first detection arm, the second electrode 32b for the first detection arm, the first electrode 32a' for the second detection arm, and the second electrode 32b' for the second detection arm are commonly connected. Further, the third electrode 32c for the first detection arm, the fourth electrode 32d for the first detection arm, the third electrode 32c' for the second detection arm, and the fourth electrode 32d' for the second detection arm are commonly connected.

In the first detection arm 30, the electrical fields (+Ex and −Ex) due to the piezoelectric constant d12 are generated in accordance with the distortions (−Sy and +Sy) in the first direction (the Y-axis direction) caused by the detection vibration VB, and similarly, in the second detection arm 30', the electrical fields (+Ex and −Ex) due to the piezoelectric constant d12 are generated in accordance with the distortions (−Sy and +Sy) in the first direction (the Y-axis direction) caused by the detection vibration VB. The direction of the electrical field generated in each of the detection arms is the same. Due to the electrical field, the charge migrates in each of the detection arms. Therefore, the charge Q migrates in the direction (i.e., the direction from the terminal J1 toward the terminal J2) indicated by the arrows in FIG. 10B.

Figures 11A, 11B:
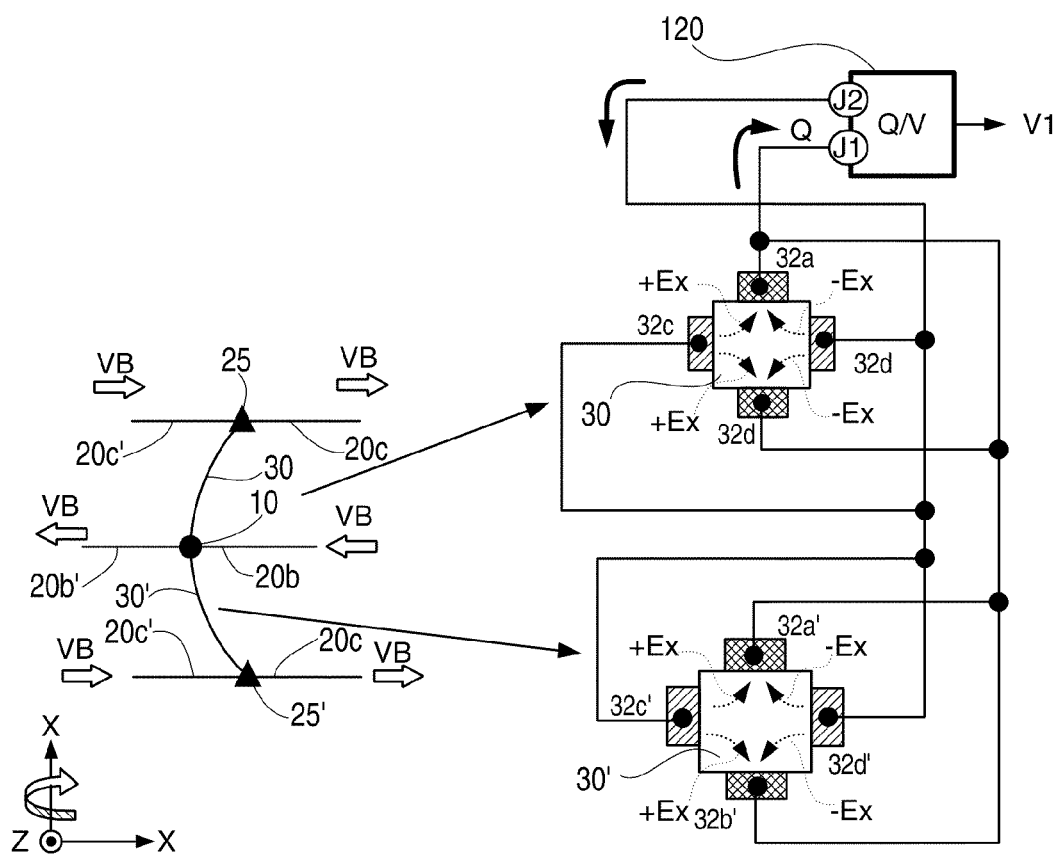
FIGS. 11A and 11B are diagrams for explaining the detection operation of the physical quantity in the vibration gyro sensor according to the second embodiment.

FIGS. 11A and 11B are diagrams for explaining the detection operation of the physical quantity in the vibration gyro sensor according to the second embodiment. In the condition in which the displacement shown in FIG. 11A occurs in each of the arms, the charge Q migrates in the direction (the direction from the terminal J2 toward the terminal J1) indicated by the arrows shown in FIG. 11B. Specifically, in the first detection arm 30, the electrical fields (+Ex and −Ex) due to the piezoelectric constant d12 are generated in accordance with the distortions (−Sy and +Sy) in the first direction (the Y-axis direction) caused by the detection vibration VB, and similarly, in the second detection arm 30', the electrical fields (+Ex and −Ex) due to the piezoelectric constant d12 are generated in accordance with the distortions (−Sy and +Sy) in the first direction (the Y-axis direction) caused by the detection vibration VB. The direction of the electrical field generated in each of the detection arms is the same. Due to the electrical field, the charge migrates in each of the detection arms. Therefore, the charge Q migrates in the direction (i.e., the direction from the terminal J2 toward the terminal J1) indicated by the arrows in FIG. 11B.

The migration of the charge Q occurs in the manner as described above, and the electrical signal (the minute current signal) due to the migration of the charge is taken out from the detection electrodes (32a through 32d, 32a' through 32d').

Third Embodiment

Figure 12:
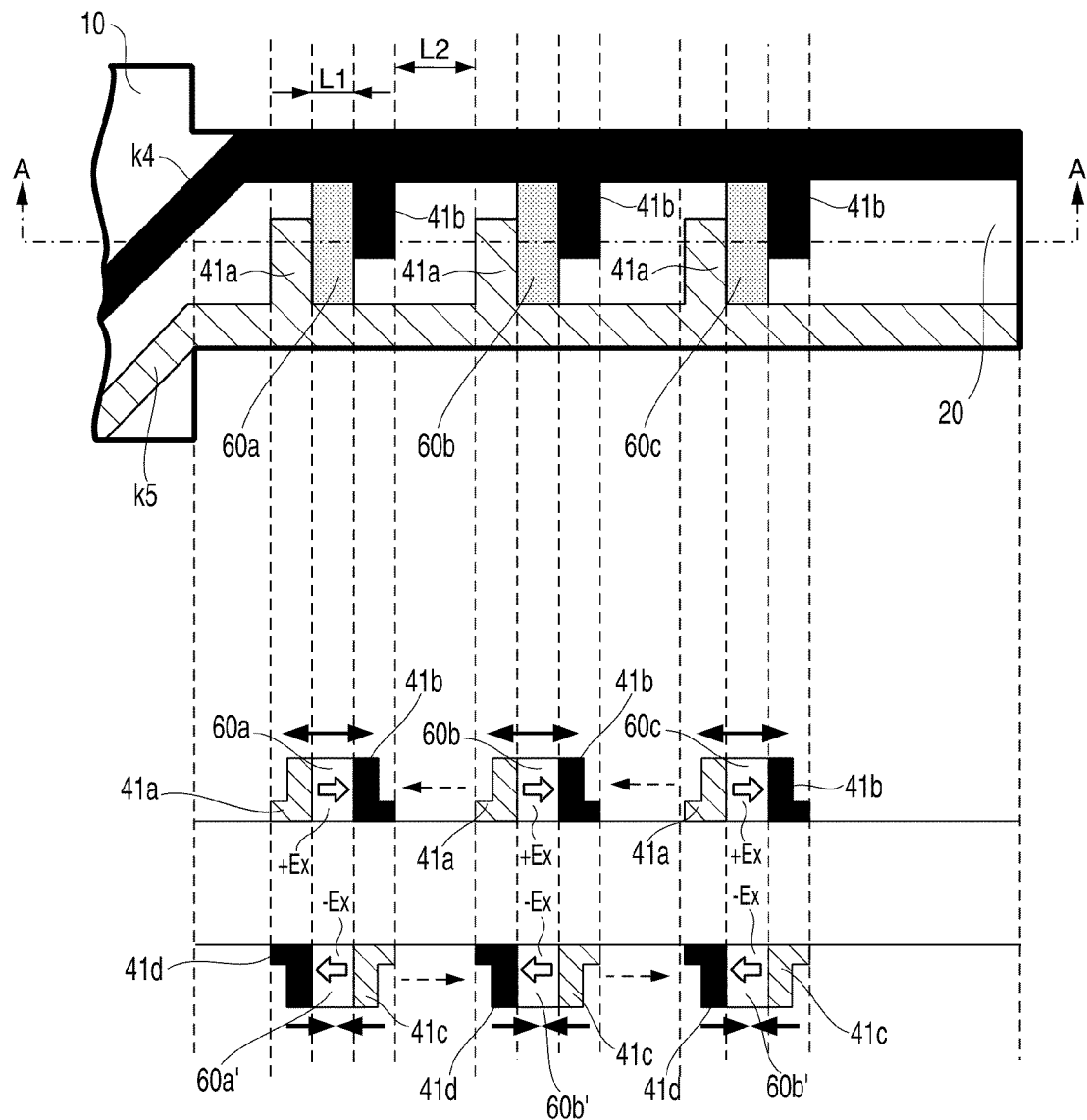
FIG. 12 is a diagram showing another example of the drive arm in the vibration gyro element.

FIG. 12 is a diagram showing another example of the drive arm in the vibration gyro element. The upper part of FIG. 12 shows a plan view of the drive arm 20, and the lower part shows a cross-sectional view of the drive arm 20 along the line A-A.

As shown in the cross-sectional view in the lower part of FIG. 12, the first surface (the obverse surface) of the drive arm 20 is provided with protruding sections 60a through 60c. Further, a pair of opposed electrodes 41a, 41b constituting the inter digital transducer is formed so as to hold each of the protruding sections 60a through 60c on the both sides thereof. Similarly, the second surface (the reverse surface) of the drive arm 20 is provided with protruding sections 60a' through 60c'. Further, a pair of opposed electrodes 41c, 41d constituting the inter digital transducer is formed so as to hold each of the protruding sections 60a' through 60c' on the both sides thereof.

According to this configuration, since the unnecessary electrical field is reduced, it is possible to increase the strength of the electrical field Ex generated between the opposed electrodes (41a and 41b, 41c and 41d). Therefore, the driving vibration can more efficiently be excited.

Further, since the dielectric constant of the air (e.g., approximately vacuum in a decompression package) is lower than the dielectric constant of the material (e.g., quartz crystal or quartz) of the vibration arms, the ineffective electrical fields (illustrated by dotted arrows in the drawing) generated between the opposed portions are weakened. Therefore, the phenomenon that the effective electrical field is canceled out by the ineffective electrical field can effectively be reduced. This point also makes a contribution to the efficient excitation of the driving vibration.

Therefore, according to the present embodiment, since the driving vibration can efficiently be excited, the amplitude of the driving vibration increases, and the amplitude of the detection vibration caused by the angular velocity also increases. Therefore, the further improvement in sensitivity of the vibration gyro sensor can be realized.

Fourth Embodiment

Figure 13:
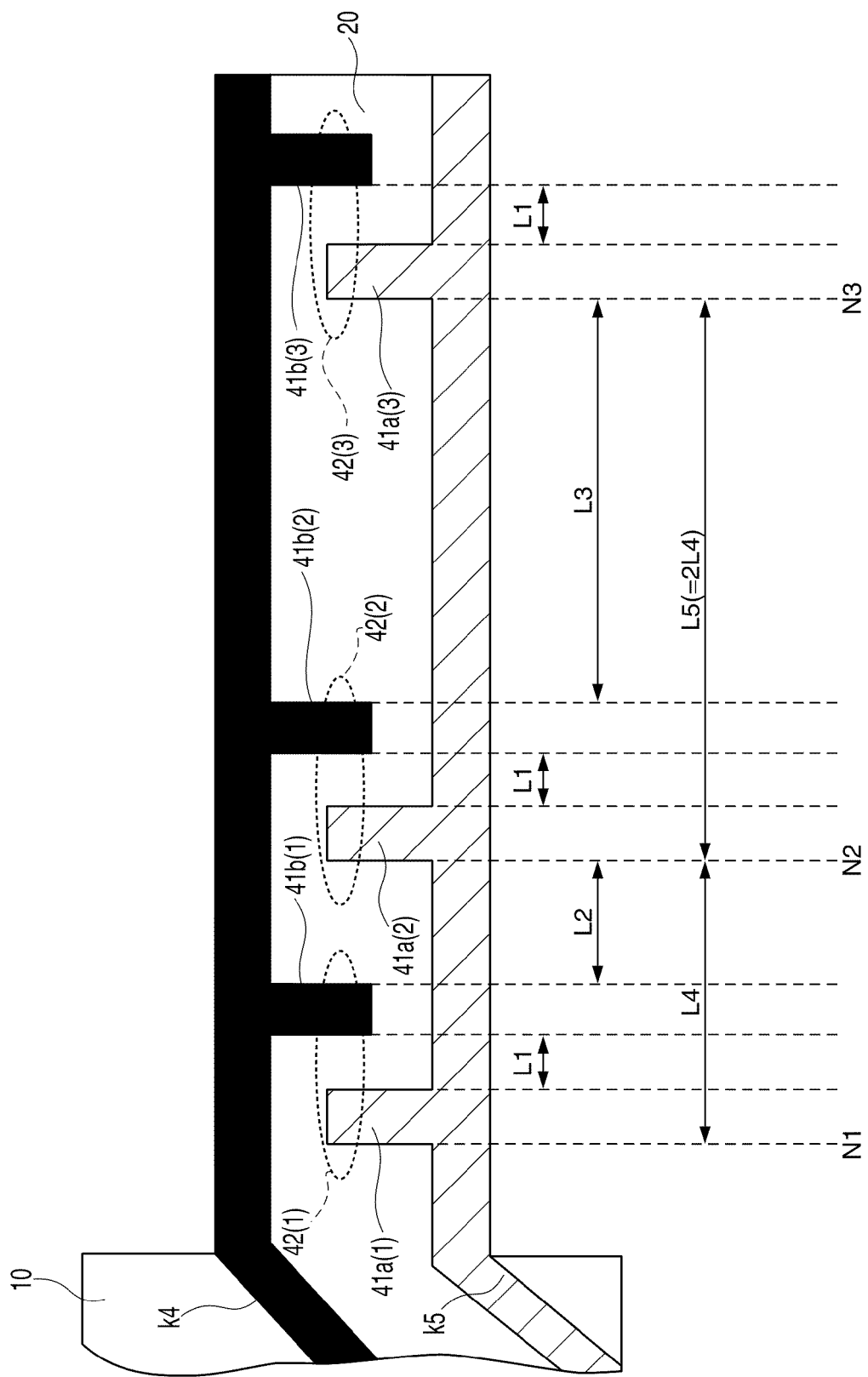
FIG. 13 is a diagram showing another configuration example of an inter digital transducer in the drive arm of the vibration gyro element.

FIG. 13 is a diagram showing another configuration example of the inter digital transducer in the drive arm of the vibration gyro element.

Although in the example explained with reference to FIG. 4D the intervals of the opposed portions in the inter digital transducer are the same, in the example shown in FIG. 13, the intervals of the opposed portions are varied in accordance with the distance from the base section 10.

In FIG. 13, the distances of the first opposed portion 42(1), the second opposed portion 42(2), and the third opposed portion 42(3) of the inter digital transducer from the base section 10 increase in the order of the description. Further, assuming that the distance between the first opposed portion 42(1) and the second opposed portion 42(2) is L2, and the distance between the second opposed portion 42(2) and the third opposed portion 42(3) is L3, L2<L3 becomes true. The reason therefor is as follows.

In order for generating the driving vibration (the out-of-plane vibration) in the drive arm 20, it is required to generate contraction and expansion (tension) distortions (stresses) in the principal surface (e.g., at least one of the obverse surface and the reverse surface) of the drive arm 20. Since the drive arm 20 vibrates in the out-of plane direction based on the base section 10 as the fixed end, the most effective distortion for bending the drive arm is the distortion at the place near to the base section 10. The distortion at the place (the tip portion) distant from the base section has a small influence on the bend of the drive arm.

Based on this speculation, in the present embodiment the intervals of the three opposed portions included in the inter digital transducer are varied in accordance with the distance from the base section. Specifically, the distance L3 between the second opposed portion 42(2) and the third opposed portion 42(3) is set larger than the distance L2 between the first opposed portion 42(1) and the second opposed portion 42(2).

In the example shown in FIG. 13, assuming that the distance between the first point N1 and the second point N2 is L4, the distance L5 between the second point N2 and the third point N3 is set to twice as large as the distance L4.

According to this configuration, the number of opposed portions arranged along the extending direction of the drive arm 20 can be reduced compared to the case of arranging the opposed portions at regular intervals (in particular in the case in which the drive arm is long, the effect of reducing the number of opposed portions is actualized). This means reduction of the total amount of the electrical fields generated in the drive arm 20, and therefore, the effect of reducing the power consumption can be obtained. On the other hand, even if the electrical field at the place distant from the base section 10 is reduced, since the extent of a contribution of the electrical field to the bend of the drive arm is small, it is possible to generate the driving vibration with necessary amplitude in the drive arm 20.

Fifth Embodiment

Figure 14A:
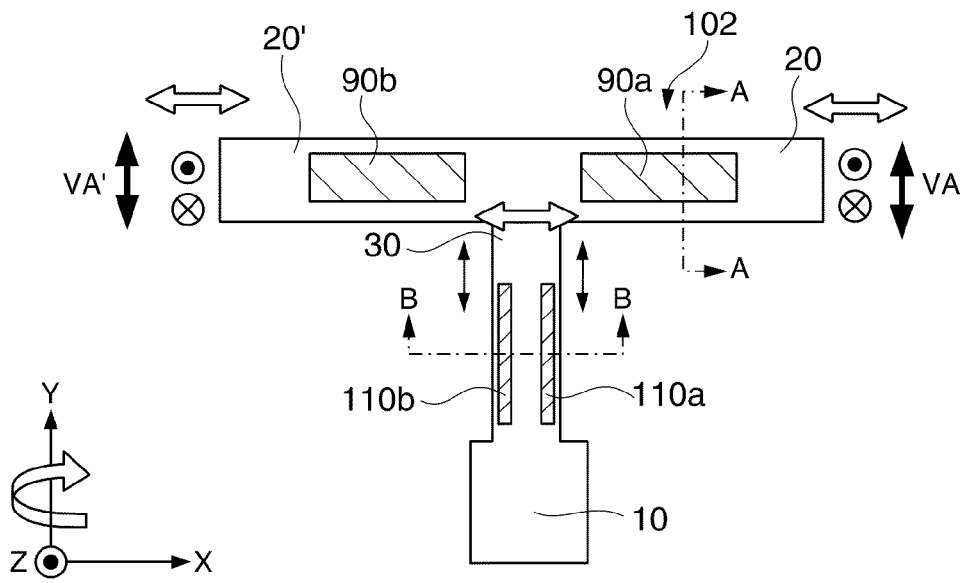
FIGS. 14A through 14C are diagrams for explaining another example (an example of forming the piezoelectric material film on the base material) of the vibration gyro element.
Figure 14B:
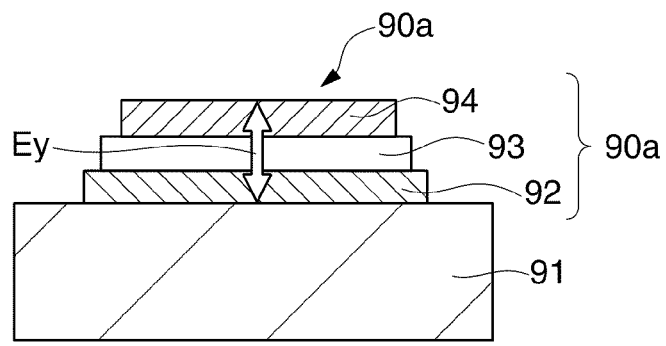
Figure 14C:
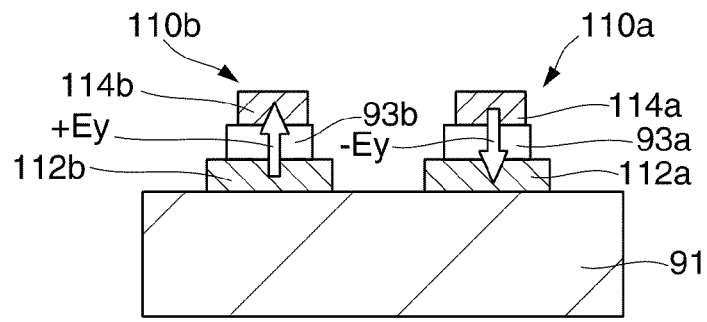

In the present embodiment, an example of forming the piezoelectric material film on the base material will be explained. FIGS. 14A through 14C are diagrams for explaining another example (an example of forming the piezoelectric material film on the base material) of the vibration gyro element.

FIG. 14A is a plan view of the vibration gyro element 102 having the piezoelectric material film (the piezoelectric film) formed on the base material. FIG. 14B is a cross-sectional view of the first drive arm 20 along the line A-A. Further, FIG. 14C is a cross-sectional view of the detection arm 30 along the line B-B. The basic operation of the vibration gyro element 102 shown in FIG. 14A is the same as that described in the first embodiment. It should be noted that in the example shown in FIGS. 14A through 14C the piezoelectric material film formed on the base material is used for exciting the driving vibration and for converting the distortion of the detection arm into the electrical signal.

The base material is a material having rigidity (such as a quartz crystal or Si), and either one of ZnO, AlN, LiNbO$_3$, and KNbO$_3$ can be used as the piezoelectric material. In FIG. 14B, on the base material 91 having rigidity, there is disposed a laminated member 90a composed of a lower drive electrode 92, a piezoelectric material film 93, and an upper electrode 94. By applying an electrical field between the lower electrode 92 and the upper electrode 94, the piezoelectric material film can be contracted. Thus, the driving vibration (the out-of-plane vibration in the third direction) can be generated in the drive arm.

It should be noted that the laminated member 90b having substantially the same laminated structure is also provided to the second drive arm 20', and the out-of-plane vibration can be generated in the second drive arm 20' by substantially the same operation.

Further, as shown in FIG. 14C, a first detecting laminated member 110a and a second detecting laminated member 110b are formed on, for example, the first surface of the detection arm 30. The first detecting laminated member 110a is composed of a lower drive electrode 112a, a piezoelectric material film 93a, and an upper electrode 114a. Further, the second detecting laminated member 110b is composed of a lower drive electrode 112b, a piezoelectric material film 93b, and an upper electrode 114b.

When the tip of the detection arm 30 bends, for example, toward the negative second direction (−X side), the electrical field +Ez due to the contraction force is generated in the piezoelectric material film 93b of the second laminated member 110b, and the electrical field −Ez due to the expansion force (tensile force) is generated in the piezoelectric material film 93a of the first laminated member 110a, and thus the migration of the charge occurs due to the electrical fields. By detecting the varying voltage due to the migration of the charge in a differential manner, the amplitude of the bending stress of the detection arm 30 can be detected, and thus the angular velocity can be detected.

Figure 15A:
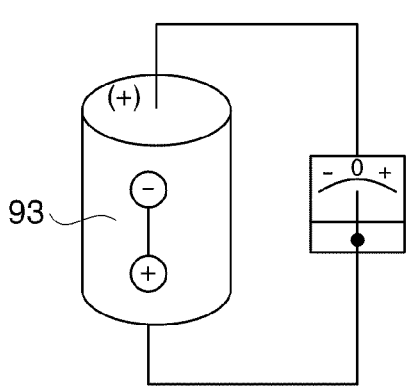
FIGS. 15A through 15F are diagrams for explaining the characteristics of the piezoelectric material film (piezoelectric ceramics).
Figure 15B:
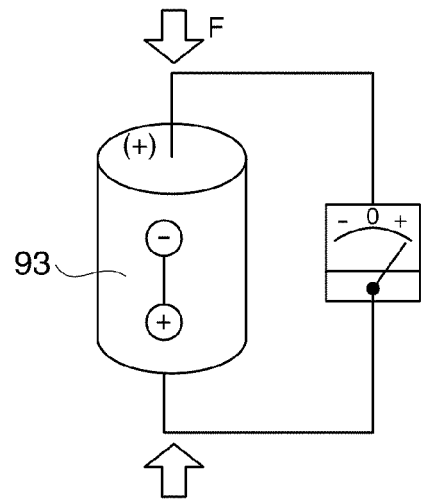
Figure 15C:
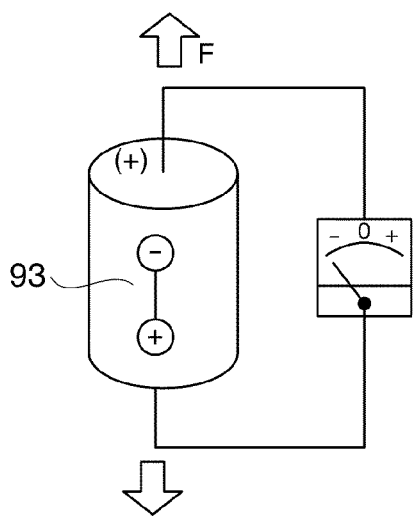

FIGS. 15A through 15F are diagrams for explaining the characteristics of the piezoelectric material film (piezoelectric ceramics). In FIGS. 15A through 15F, "(+)" and "(−)" denote the polarity, "−" surrounded by a circle denotes a polarized negative ion, and "+" surrounded by a circle denotes a polarized positive ion. FIG. 15A shows an unloaded condition. As shown in FIG. 15B, when the contraction occurs in the piezoelectric material film 93, a positive voltage is generated. Further, as shown in FIG. 15C, when the tension occurs in the piezoelectric material film 93, a negative voltage is generated.

Figure 15D:
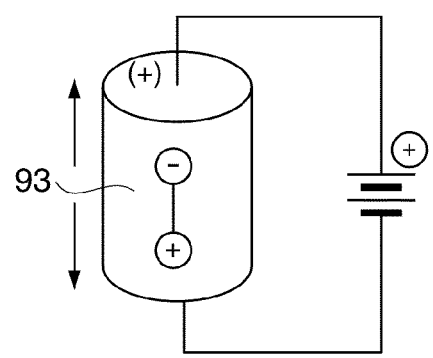
Figure 15E:
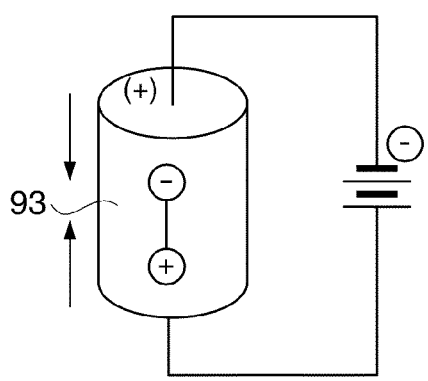
Figure 15F:
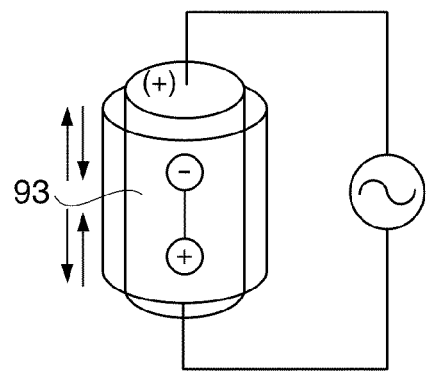

Further, as shown in FIG. 15D, when a positive voltage is applied to the piezoelectric material film 93, a tensile stress is generated in the piezoelectric material film 93. Further, as shown in FIG. 15E, when a negative voltage is applied to the piezoelectric material film 93, a contraction stress is generated in the piezoelectric material film 93. Therefore, as shown in FIG. 15F, when an alternating current signal is supplied to the piezoelectric material film 93, expansion and contraction can be generated in the piezoelectric material film 93. By using such characteristics of the piezoelectric material film, as explained using the example shown in FIGS. 14A through 14C, the driving vibration (the out-of-plane vibration in the third direction) can be generated in the drive arm, and further, the stress generated in the drive arm can also be converted into an electrical signal.

Sixth Embodiment

Figure 16:
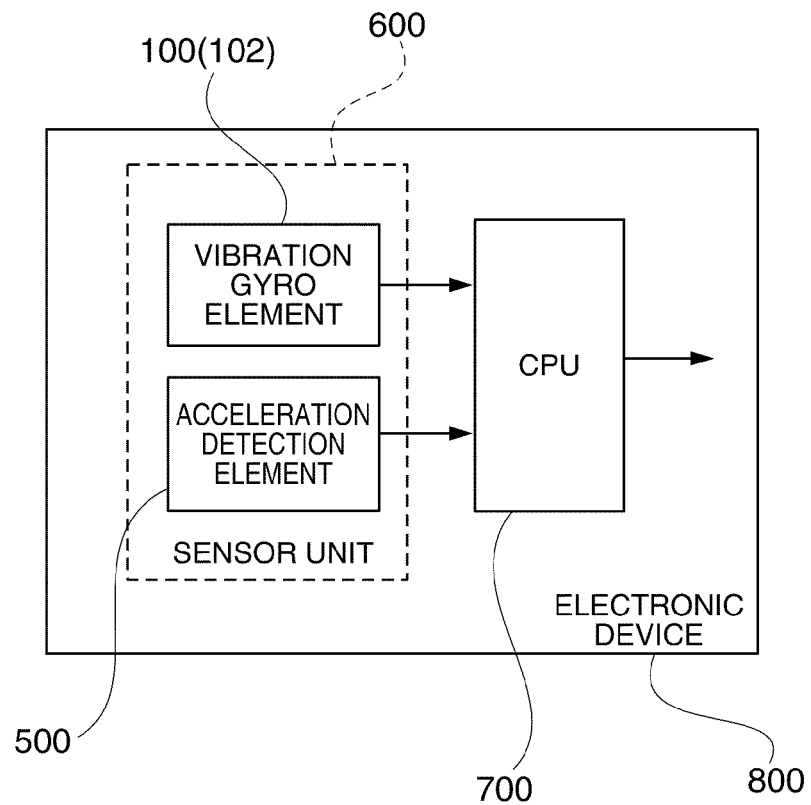
FIG. 16 is a diagram showing an example of a configuration of an electronic device including the vibration gyro sensor.

In the present embodiment, an example of the electronic device will be explained. The electronic device including the vibration gyro sensor will be explained with reference to FIG. 16. FIG. 16 is a diagram showing an example of a configuration of the electronic device including the vibration gyro sensor.

In FIG. 16, a high-performance sensor unit (a kind of electronic device) 600 can be realized by combining the vibrating gyro element 100 (or 102) of any one of the embodiments described above and another type of detection element (here, the acceleration detection element is assumed) 500 with each other.

Further, by mounting the sensor unit 600 (and a CPU 700, for example) on an electronic device 800 such as a camera or FA equipment, it is possible to make the electronic device 800 more high-performance. In other words, since the vibration gyro sensor 100 (102) is capable of detecting the angular velocity with extremely high accuracy compared to the related art, and therefore, the performance of the electronic device (600, 800) is improved.

Figure 18:
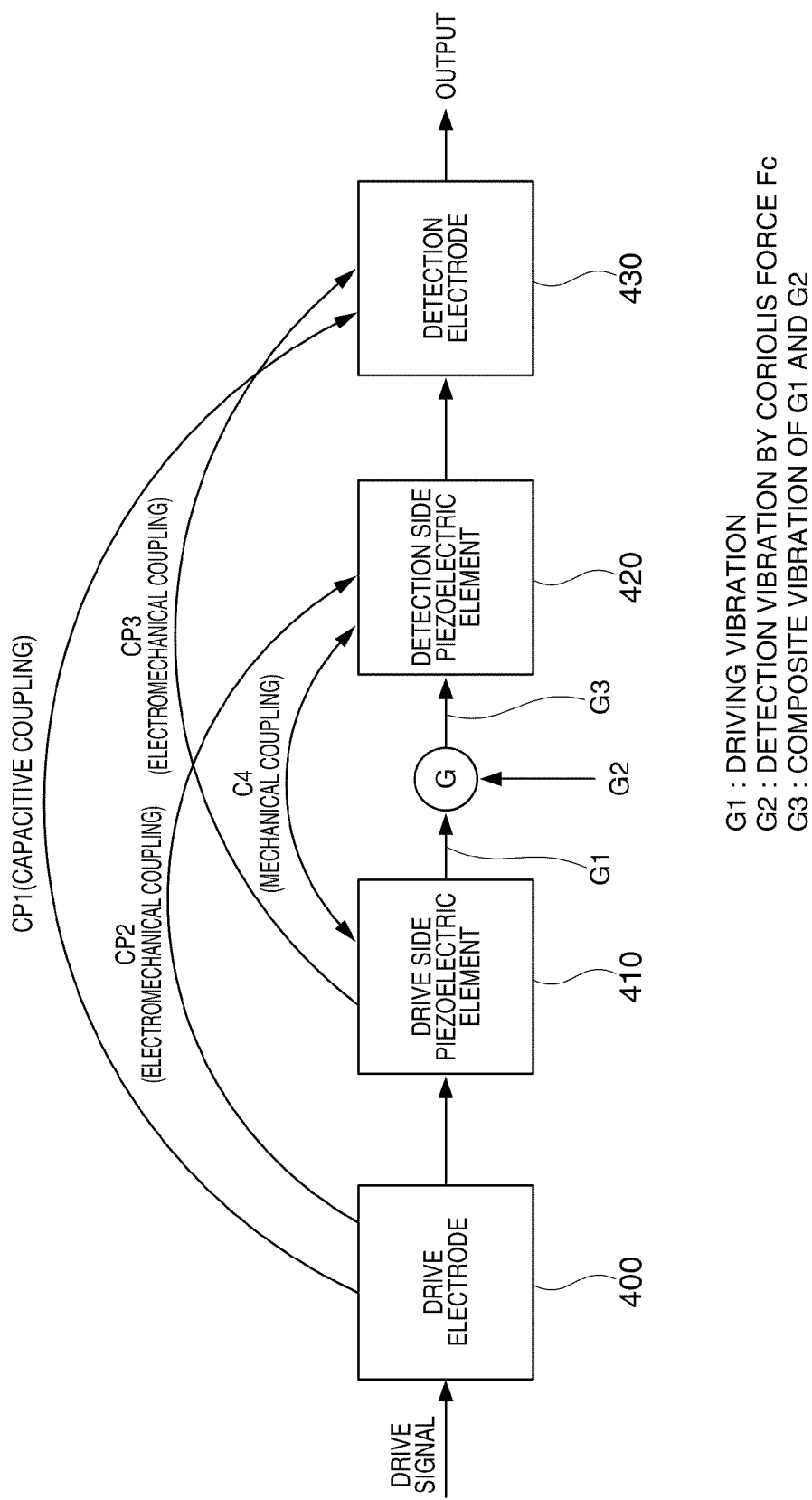
FIG. 18 is a diagram for explaining the capacitive coupling, the electromechanical coupling, and the mechanical coupling in the vibration gyro sensor.
Figure 19A:
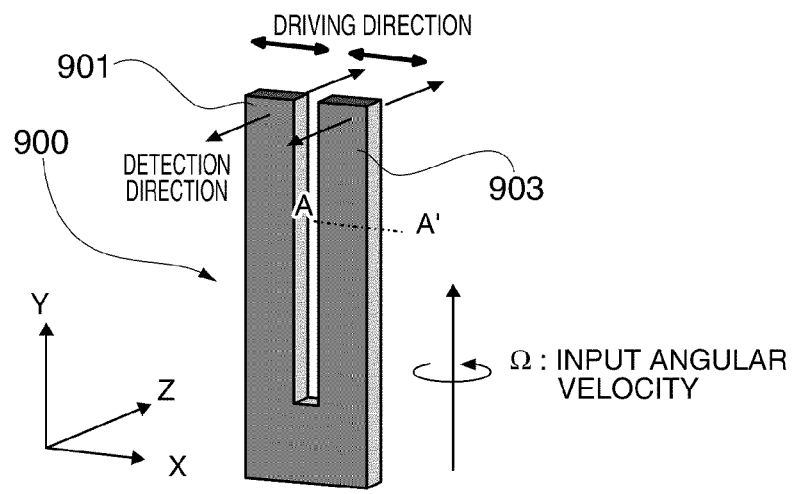
FIGS. 19A through 19C are diagrams for explaining the mechanical coupling in the vibration gyro sensor in the related art.
Figures 19B, 19C:
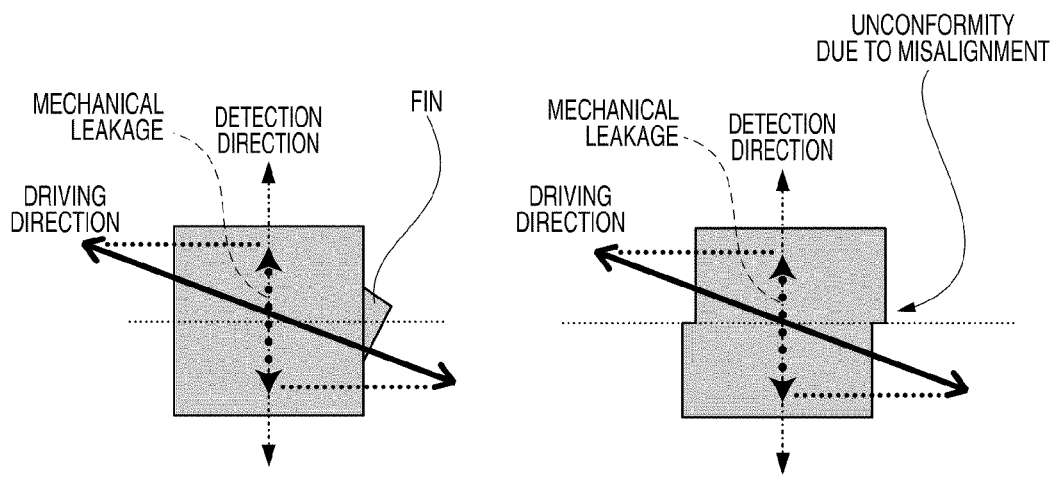

Explanation of Capacitive Coupling, Electromechanical Coupling, and Mechanical Coupling FIG. 18 is a diagram for explaining the capacitive coupling, the electromechanical coupling, and the mechanical coupling in the vibration gyro sensor. In FIG. 18, if the drive electrodes 400 and the detection electrodes 430 are disposed close to each other, a parasitic capacitance is formed between the electrodes. Therefore, the capacitive coupling (crosstalk) CP1 becomes easy to occur between the electrodes.

Further, in the case in which the drive electrodes 400 and the detection electrodes 430 are disposed close to each other, and at the same time, the drive electrodes 400 and the detection electrodes 430 are different in electrical potential from each other, an unintended unnecessary electrical field is generated, and an unnecessary vibration component associated therewith is generated. In other words, the electromechanical couplings CP2 and CP3 are generated.

Further, the case in which a part of the driving vibration generated in the drive arm leaks into (is propagated to) the detection arm due to the mechanical coupling C4 via the material having rigidity is also possible. As described above, in the vibration gyro sensor according to each of the embodiments of the invention, since the drive arms and the detection arm are separated from each other, the electrode arrangement and the wiring in each of the arms can reasonably be performed. Further, since the drive arms and the detection arm are separated from each other, the influence of the capacitive coupling or the electromechanical coupling can also be reduced.

Further, as explained above, in each of the embodiments of the invention, the unnecessary driving vibration component leaking from the drive arm is canceled out to be sufficiently reduced. Therefore, the influence of the mechanical coupling can be reduced.

As described above, in the vibration gyro element according to at least one of the embodiments of the invention, since the unnecessary vibration component due to the mechanical coupling is canceled out and is sufficiently reduced, the superfluous signal due to the mechanical coupling can be reduced even in the case in which the machining error exists. Therefore, the influence of the variation in the mechanical coupling due to the temperature is also small, and therefore, the gyro sensor having preferable temperature stability can be realized. Further, since the superfluous signal due to the mechanical coupling does not occur, the Coriolis force can efficiently be detected, and a low-noise gyro sensor can be realized. Additionally, since the out-of-plane vibration (the vibration in the "walk" mode) is used as the driving vibration, the detection vibration generated in the drive arm can more efficiently be transferred to the detection arm compared to the case of using the in-plane driving vibration in the related art, and thus the vibration gyro sensor (the vibration gyroscope) capable of performing the detection with high accuracy can be realized. Therefore, the detection efficiency of the physical quantities can dramatically be improved. It should be noted that the vibration gyro sensor includes the vibration gyro element of any one of the embodiments described above and a detection circuit (reference numeral 140 shown in FIG. 5) for detecting the angular velocity acting around the axis in, for example, the first direction based on the electrical signal output from the detection electrodes.

Further, in the embodiment described above, by disposing the first vibration arm, which can be the drive arm or the detection arm, and the vibration arm, which can be the detection arm or the drive arm, so as to be, for example, perpendicular to each other, and forming the inter digital transducer on either one of the vibration arms and the detection electrodes on the other vibration arm in accordance with the usage, the detection axis of the angular velocity can be switched. In the embodiment of the invention, such an application is possible according to needs.

Although the invention is hereinabove explained using some embodiments, the invention is not limited to those embodiments, and those skilled in the art can easily understand that various modifications are possible within the scope and the spirit of the invention. Therefore, such modified examples should be included in the scope of the invention. For example, a term described at least once with a different term having a broader sense or the same meaning in the specification or the accompanying drawings can be replaced with the different term in any part of the specification or the accompanying drawings. Further, the vibration gyro sensor according to the invention can be applied to the electronic device such as a digital camera, a car navigation system, a cellular phone, a mobile PC, or a game controller. By using the vibration gyro sensor according to the invention, the detection accuracy of the angular velocity (the physical quantity) of the electronic device can be improved.

The entire disclosure of Japanese Patent Application No. 2010-063901, filed Mar. 19, 2010 is expressly incorporated by reference herein.

What is claimed is:

1. A vibration gyro element comprising:
   a base section;
   a detection arm extending from the base section in a first direction;
   a joint section disposed at an end portion of the detection arm opposite to another end portion near to the base section;
   a first drive arm extending from the joint section in a second direction intersecting with the first direction in a plan view;
   a second drive arm extending from the joint section in a direction opposite to the second direction;
   a first drive electrode provided to the first drive arm;
   a second drive electrode provided to the second drive arm; and
   a detection electrode provided to the detection arm,
   wherein the first drive arm and the second drive arm vibrate at the same time, in-phase, in a third direction perpendicular to the first direction and the second direction, so as to detect a physical quantity acting around an axis in the first direction.

2. The vibration gyro element according to claim 1, wherein
   the detection arm, the first drive arm, and the second drive arm are all made of a same piezoelectric material.

3. The vibration gyro element according to claim 1, wherein
   the first drive arm, the second drive arm, and the detection arm each have a pair of principal surfaces opposed to each other and a pair of side surfaces coupling the principal surfaces to each other,
   the first drive electrode and the second drive electrode are respectively disposed on at least one of the pair of principal surfaces of the first drive arm and the pair of principal surfaces of the second drive arm, and respectively form first and second interdigital transducer electrodes in which the first and second drive electrodes are arranged in the second direction, and
   the detection electrode is disposed on the pair of principal surfaces and the pair of side surfaces of the detention arm in a solid manner.

4. The vibration gyro element according to claim 3, wherein
   each of the first and second interdigital transducer electrodes is configured with a plurality of electrodes that are provided in a comb-like pattern, distances between a plurality of two adjacent electrodes are different.

5. The vibration gyro element according to claim 4, wherein
   a first distance of the distances between the plurality of two adjacent electrodes located in a vicinity of a tip of either of the first and second drive arms is larger than a second distance of the distances between the plurality of two adjacent electrodes located in a vicinity of the joint section.

6. A vibration gyro sensor comprising:

the vibration gyro element according to claim 1; and a detection circuit adapted to detect the physical quantity acting around the axis in the first direction based on an electrical signal output from the detection electrode.

7. An electronic device comprising:

a first sensor including the vibration gyro element according to claim 1; and a second sensor including a detection element adapted to detect a second physical quantity different from the physical quantity detected by the first sensor.

8. A vibration gyro element comprising:

a base section;

a first detection arm extending from the base section in a first direction;

a second detection arm extending from the base section in a direction opposite to the first direction;

a first joint section disposed at an end portion of the first detection arm opposite to the base section;

a second joint section disposed at an end portion of the second detection arm opposite to the base section;

a first drive arm extending from the first joint section in a second direction intersecting with the first direction in a plan view;

a second drive arm extending from the first joint section in a direction opposite to the second direction;

a third drive arm extending from the base section in the second direction;

a fourth drive arm extending from the base section in a direction opposite to the second direction;

a fifth drive arm extending from the second joint section in the second direction; and a sixth drive arm extending from the second joint section in a direction opposite to the second direction, wherein the first through sixth drive arms respectively have first through sixth drive electrodes, the first and second detection arms respectively have first and second detention electrodes, wherein the first, second, fifth and sixth drive arms vibrate at the same time, in-phase, in a third direction perpendicular to the first direction and the second direction;

the third and fourth drive arms vibrate in a direction opposite to the third direction at the same time so as to detect a physical quantity acting around an axis in the first direction.

9. The vibration gyro element according to claim 8, wherein the first through sixth drive arms, the first detection arm, and the second detection arm each have a pair of principal surfaces opposed to each other and a pair of side surfaces coupling the principal surfaces to each other, each of the first through sixth drive electrodes is disposed on at least one of the pair of principal surfaces, and forms an interdigital transducer electrode in which each of the first through sixth drive electrodes is arranged in the second direction, and the first and second detection electrodes are respectively disposed on the pair of principal surfaces and the pair of side surfaces in a solid manner.

10. A method of detecting a physical quantity of a vibration gyro sensor, the method comprising:

providing a vibration gyro element including a base section, a detection arm extending from the base section in a first direction, a joint section disposed at an end portion of the detection arm opposite to the base section, a first drive arm extending from the joint section in a second direction intersecting with the first direction in a plan view, and a second drive arm extending from the joint section in a direction opposite to the second direction;

vibrating the first drive arm and the second drive arm at the same time, in-phase, in a third direction perpendicular to the first direction and the second direction;

generating a Coriolis force in the first drive arm and the second drive arm in accordance with the physical quantity acting around an axis in the first direction, thereby generating a detection vibration in the second direction in the detection arm; and detecting the physical quantity based on an electrical signal generated by a migration of a charge due to an electrical field generated by the detection vibration.

* * * * *